US010602206B2

(12) United States Patent
Oh et al.

(10) Patent No.: US 10,602,206 B2
(45) Date of Patent: Mar. 24, 2020

(54) METHOD AND SYSTEM FOR PROVIDING TIME MACHINE FUNCTION IN LIVE BROADCAST

(71) Applicant: NAVER Corporation, Seongnam-si (KR)

(72) Inventors: Jaewon Oh, Seongnam-si (KR); SeungKwan Yang, Seongnam-si (KR); ByungJo Yoon, Seongnam-si (KR); Kiyoung Park, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 268 days.

(21) Appl. No.: 15/353,990

(22) Filed: Nov. 17, 2016

(65) Prior Publication Data

US 2017/0164019 A1 Jun. 8, 2017

(30) Foreign Application Priority Data

Dec. 8, 2015 (KR) ........................ 10-2015-0174153

(51) Int. Cl.
*H04N 21/2387* (2011.01)
*H04L 29/06* (2006.01)
(Continued)

(52) U.S. Cl.
CPC ..... *H04N 21/2387* (2013.01); *H04L 65/1083* (2013.01); *H04L 65/4076* (2013.01);
(Continued)

(58) Field of Classification Search
CPC . H04L 65/1083; H04L 65/4076; H04L 65/60; H04L 65/608; H04N 21/2387; H04N 21/2187; H04N 21/6587
See application file for complete search history.

(56) References Cited

U.S. PATENT DOCUMENTS 9,942,578 B1 * 4/2018 Vantalon .......... H04N 21/23113
2013/0173818 A1 * 7/2013 Tseng ................. H04N 21/2343
709/231

(Continued)

FOREIGN PATENT DOCUMENTS

JP 2004151970 5/2004
JP 2004312413 11/2004
(Continued)

OTHER PUBLICATIONS

Korean Office Action issued in corresponding to Korean patent application No. 10-2016-0164303, dated Feb. 17, 2017.
(Continued)

*Primary Examiner* — Philip J Chea
*Assistant Examiner* — Robert B McAdams
(74) *Attorney, Agent, or Firm* — Greer, Burns & Crain Ltd.

(57) ABSTRACT

Provided is a time machine function providing method including setting, at a streaming client installed on the electronic device, a streaming session with a player installed on the electronic device to provide a live streaming service; sequentially transmitting, by the streaming client, live stream data received over a network to the player through the streaming session; setting, at the streaming client, a time machine control session with the player; receiving, at the streaming client, a time machine control request from the player through the time machine control session; and transmitting, by the streaming client, live stream data of a channel corresponding to a time machine control request that includes play location information among time machine control requests sequentially from a play location specified based on the play location information through the streaming session.

20 Claims, 13 Drawing Sheets

(51) Int. Cl.
*H04N 21/6587* (2011.01)
*H04N 21/2187* (2011.01)

(52) U.S. Cl.
CPC ............ *H04L 65/60* (2013.01); *H04L 65/608* (2013.01); *H04N 21/2187* (2013.01); *H04N 21/6587* (2013.01)

(56) References Cited

U.S. PATENT DOCUMENTS

| | | | |
|---|---|---|---|
| 2013/0260893 A1 | 10/2013 | Shin et al. | |
| 2013/0276048 A1* | 10/2013 | Krasic | H04N 21/2187 |
| | | | 725/116 |
| 2013/0332543 A1 | 12/2013 | Shin et al. | |
| 2014/0019540 A1 | 1/2014 | Shin et al. | |
| 2014/0281010 A1* | 9/2014 | Panje | H04L 65/60 |
| | | | 709/231 |
| 2015/0020127 A1* | 1/2015 | Doshi | H04N 21/47202 |
| | | | 725/88 |
| 2015/0026468 A1* | 1/2015 | Riegel | G06F 21/6218 |
| | | | 713/168 |

FOREIGN PATENT DOCUMENTS

| | | |
|---|---|---|
| JP | 2009512288 | 3/2009 |
| JP | 2012124748 | 6/2012 |
| JP | 2013013035 | 1/2013 |
| KR | 2008-0037770 A | 5/2008 |
| KR | 10-2008-0050477 | 6/2008 |
| KR | 10-2011-0030464 | 3/2011 |
| KR | 10-1192966 | 10/2012 |
| KR | 10-2013-0133084 | 12/2013 |
| WO | WO 2015/065001 A1 | 5/2015 |

OTHER PUBLICATIONS

Japanese Office Action issued in corresponding to Japanese Patent Application No. 2016-220279, dated Nov. 21, 2017.

* cited by examiner

General case

Exceptional case

METHOD AND SYSTEM FOR PROVIDING TIME MACHINE FUNCTION IN LIVE BROADCAST

CROSS-REFERENCE TO RELATED APPLICATION(S)

This application claims priority under 35 U.S.C. § 119 to Korean Patent Application No. 10-2015-0174153 filed on Dec. 8, 2015, in the Korean Intellectual Property Office (KIPO), the entire contents of which are incorporated herein by reference.

BACKGROUND

Field

One or more example embodiments of the present invention relate to a method and system for providing a time machine function in a live broadcast.

Description of Related Art

A time machine function of video content, for example, a broadcast program, which is provided live, refers to a function that enables a user to arbitrarily view at least a portion of a live video after a preset period of time is elapsed. The time machine function may be provided using a method of storing a live video and replaying the stored live video. For example, Korean Patent Registration No. 10-1300882 discloses an image display device having a time machine function and a control method thereof.

In the related art, as for a time machine function provided at a streaming service, players of electronic devices that play video contents employ different streaming standards based on an operating system (OS) or a platform. For example, a flash player of a personal computer (PC) uses a real-time messaging protocol (RTMP) as a streaming protocol, and a player of iOS or Android uses a hypertext transport protocol (HTTP) live streaming (HLS) protocol as a streaming protocol. Here, in the related art, a control session for the time machine function is constructed for each streaming protocol.

Reference materials may include PCT/KR/2014/010167, US20140019540A1, US20130332543A1, and US20130260893.

SUMMARY

One or more example embodiments provide a method and system that enables a time machine control protocol to be in charge of only controlling a time machine function, and enables a streaming protocol between a streaming client and a player to use a streaming standard supported at the player as is.

One or more example embodiments also provide a method and system that may control a time machine function using the same standard regardless of an operating system (OS) or a player, and may remove a dependence of a streaming client on the player.

According to an aspect of at least one example embodiment, there is provided a non-transitory computer-readable recording medium storing a computer program to implement a time machine function providing method in combination with a computer that configures an electronic device, wherein the time machine function providing method includes setting, at a streaming client installed on the electronic device, a streaming session with a player installed on the electronic device to provide a live streaming service; sequentially transmitting, at the streaming client, live stream data received over a network to the player through the streaming session; setting, at the streaming client, a time machine control session with the player; receiving, at the streaming client, a time machine control request from the player through the time machine control session; and transmitting, at the streaming client, live stream data of a channel corresponding to a time machine control request that includes play location information among time machine control requests sequentially from a play location specified based on the play location information through the streaming session.

A data transmission between the streaming client and the player through the streaming session and a data transmission between the streaming client and the player through the time machine control session may proceed based on different separate protocols, respectively.

The time machine function providing method may further include receiving, at the streaming client, an authorization request from the player through the time machine control session, the authorization request including information used to specify live stream data or a channel and an authorization key; and authorizing, at the streaming client, the player using the authorization key, and in response to a success in authorizing the player, including an eigenvalue assigned to the time machine control session in a response to the authorization request as a session key, and transmitting the response to the player.

The time machine function providing method may further include verifying, at the streaming client, whether the time machine control request includes the session key, and authorizing the time machine control request.

The time machine function providing method may further include, in response to authorizing another player in response to an authorization request from the other player installed on the electronic device, transmitting, at the streaming client, a session key that includes an eigenvalue assigned to a time machine control session set with the other player to the other player, and invalidating a session key with an existing player.

The time machine function providing method may further include receiving, at the streaming client, an information acquirement and session maintain request from the player through the time machine control session; and including, at the streaming client, time machine time information about the live stream data that is being provided to the player through the streaming session, in a response to the information acquirement and session maintain request, and transmitting the response to the player through the time machine control session.

The time machine time information may include a maximum available shift time preset for each set of live stream data as an index indicating a level capable of seeking previous data based on latest data of the live stream data, a current available shift time that is an index indicating a level capable of seeking previous data at a current point in time based on the latest data, and a current shift time that is an index specifying previous data currently being played through a time machine function based on the latest data.

The time machine function providing method may further include receiving, at the streaming client, channel identification information and a play request that includes a program key for identifying live stream data of a specific program in live stream data of a channel identified based on the channel identification information, through the time machine control session; and sequentially transmitting, at the streaming client to the player, live stream data identified through the program key in the live stream data of the channel identified based on the channel identification information.

The live stream data may be transmitted from a delivery server to the electronic device over the network, and the live stream data may be matched for each channel and each program based on the channel identification information and the program key, and thereby stored in a time machine buffer included in the delivery server.

The play request may further include information about at least one of availability of a time machine function, an initial play start location of the identified live stream data, and whether to start a channel in a pause state.

The time machine function providing method may further include storing, at the streaming client, a currently playing location in the live stream data in response to receiving a pause request through the time machine control session, and suspending a transmission of the live stream data; and sequentially transmitting, at the streaming client, the live stream data to the player from the stored location, in response to receiving a resume request through the time machine control session.

A connection of the channel may be terminated in response to the pause request and may be resumed in response to the resume request.

The time machine function providing method may further include transmitting, at the streaming client, on-air information regarding whether the live stream data is currently on air and a current shift time that is an index specifying previous data currently being played through a time machine function based on latest data of the live stream data, as a response to the time machine control request to the player through the time machine control session, and the player determines a program stop time based on a combination of the on-air information and the current shift time.

According to another aspect of at least one example embodiment, there is provided a time machine function providing method of an electronic device configured as a computer, the method including setting, at a streaming client installed on the electronic device, a streaming session with a player installed on the electronic device to provide a live streaming service; sequentially transmitting, at the streaming client, live stream data received over a network to the player through the streaming session; setting, at the streaming client, a time machine control session with the player; receiving, at the streaming client, a time machine control request from the player through the time machine control session; and transmitting, at the streaming client, live stream data of a channel corresponding to a time machine control request that includes play location information among time machine control requests sequentially from a play location specified based on the play location information through the streaming session.

A data transmission between the streaming client and the player through the streaming session and a data transmission between the streaming client and the player through the time machine control session may proceed based on different separate protocols, respectively.

The time machine function providing method may further include receiving, at the streaming client, an authorization request from the player through the time machine control session, the authorization request including information used to specify live stream data or a channel and an authorization key; and authorizing, at the streaming client, the player using the authorization key, and in response to a success in authorizing the player, including an eigenvalue assigned to the time machine control session in a response to the authorization request as a session key, and transmitting the response to the player.

The time machine function providing method may further include receiving, at the streaming client, an information acquirement and session maintain request from the player through the time machine control session; and including, at the streaming client, time machine time information about live stream data that is being provided to the player through the streaming session, in a response to the information acquirement and session maintain request, and transmitting the response to the player through the time machine control session.

The time machine function providing method may further include receiving, at the streaming client, channel identification information and a play request that includes a program key for identifying live stream data of a specific program in live stream data of a channel identified based on the channel identification information, through the time machine control session; and sequentially transmitting, at the streaming client to the player, live stream data identified through the program key in the live stream data of the channel identified based on the channel identification information.

The time machine function providing method may further include storing, at the streaming client, a currently playing location in the live stream data in response to receiving a pause request through the time machine control session, and suspending a transmission of the live stream data; and sequentially transmitting, at the streaming client, the live stream data to the player from the stored location, in response to receiving a resume request through the time machine control session.

The time machine function providing method may further include transmitting, at the streaming client, on-air information regarding whether the live stream data is currently on air and a current shift time that is an index specifying previous data currently being played through a time machine function based on latest data of the live stream data, as a response to the time machine control request to the player through the time machine control session. The player may determine a program stop time based on a combination of the on-air information and the current shift time.

According to some example embodiments, a time machine control protocol may be in charge of only controlling a time machine function and a streaming protocol between a streaming client and a player may be configured to use a streaming standard supported at the player as is.

Also, according to some example embodiments, it is possible to remove a dependence of a streaming client on a player by controlling a time machine function using the same standard regardless of an OS or the player.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
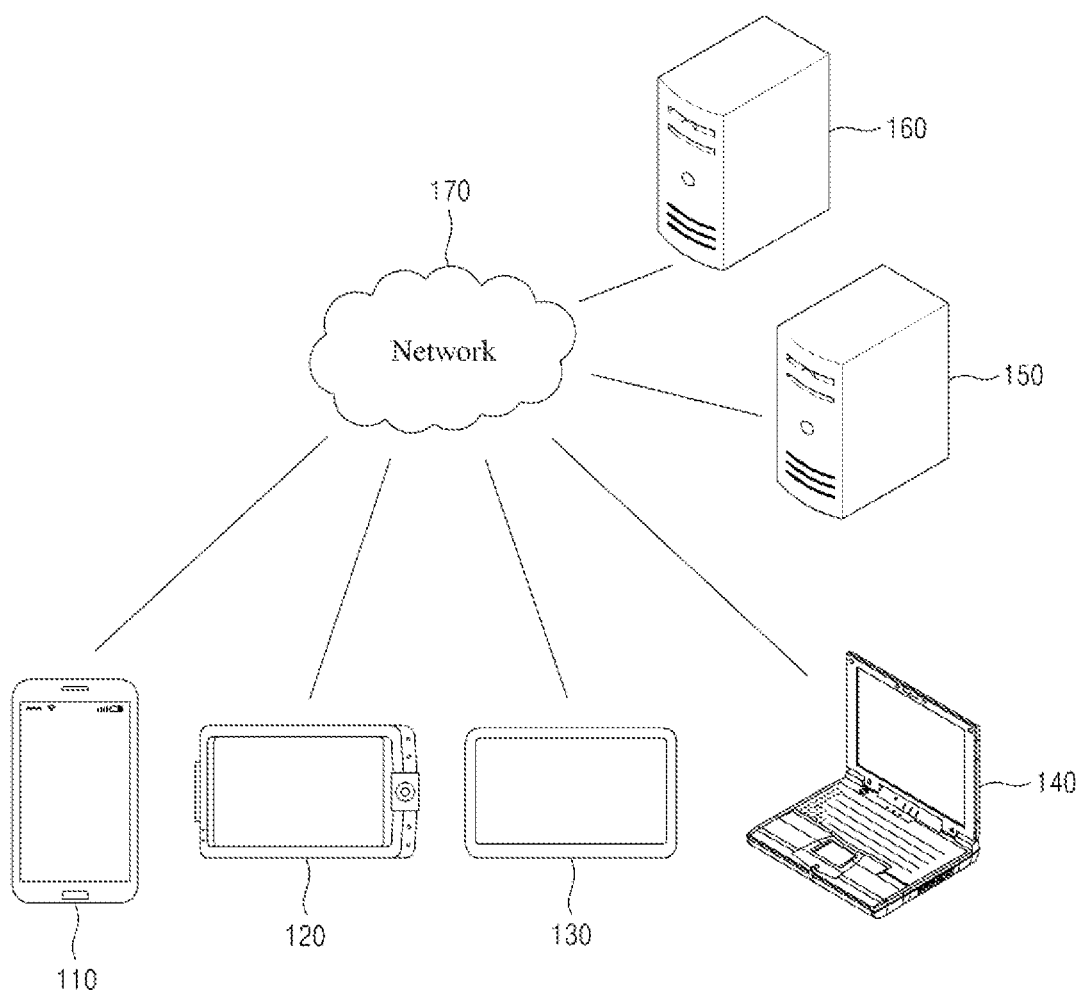
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, file, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. Also, the server 160 may connect to the server 150 under control of at least one program, for example, a browser or the installed application, an operating system (OS) included in the electronic device 110, and may use a service or content provided from the server 150. For example, in response to a service request message transmitted from the electronic device 110 to the server 150 over the network 170 under control of the application, the server 150 may transmit a code corresponding to the service request message to the electronic device 110, and the electronic device 110 may provide content to the user by configuring and displaying a screen corresponding to the code under control of the application. As another example, the server 150 may set a communication session for a messaging service and may rout a message transmission and reception between the plurality of electronic devices 110, 120, 130, and/or 140 through the set communication session. As another example, the server 150 may provide a social network service to the electronic devices 110, 120, 130, and/or 140. Also, the servers 150 and/or 160 may provide a live streaming service to the plurality of electronic devices 110, 120, 130, and/or 140.

Figure 2:
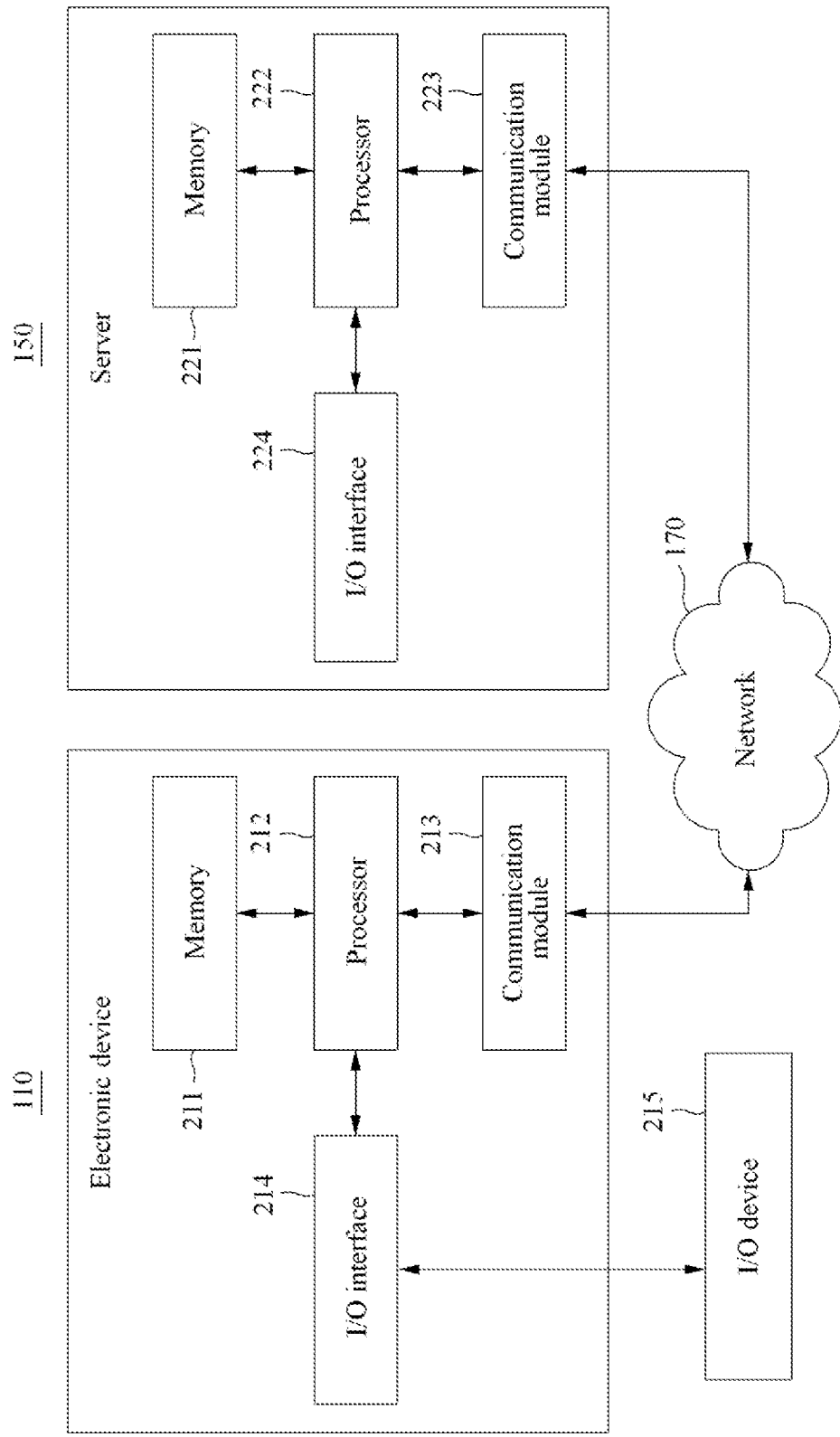
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 includes a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Here, ROM and the permanent mass storage device may be included using a separate permanent storage device, separate from the memory 211, 221. Also, an OS and at least one program code, for example, the aforementioned code for browser or the application installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication modules 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processors 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication modules 213, 223 to the processors 212, 222. For example, the processors 212, 222 may be configured to execute received instructions in response to the program code stored in the storage device, such as the memory 211, 222.

The communication modules 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a streaming service request for content, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214. Similarly, the I/O interface 224 may be a device used for interface with an I/O device (not shown) for the server 150.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like.

Figure 3:
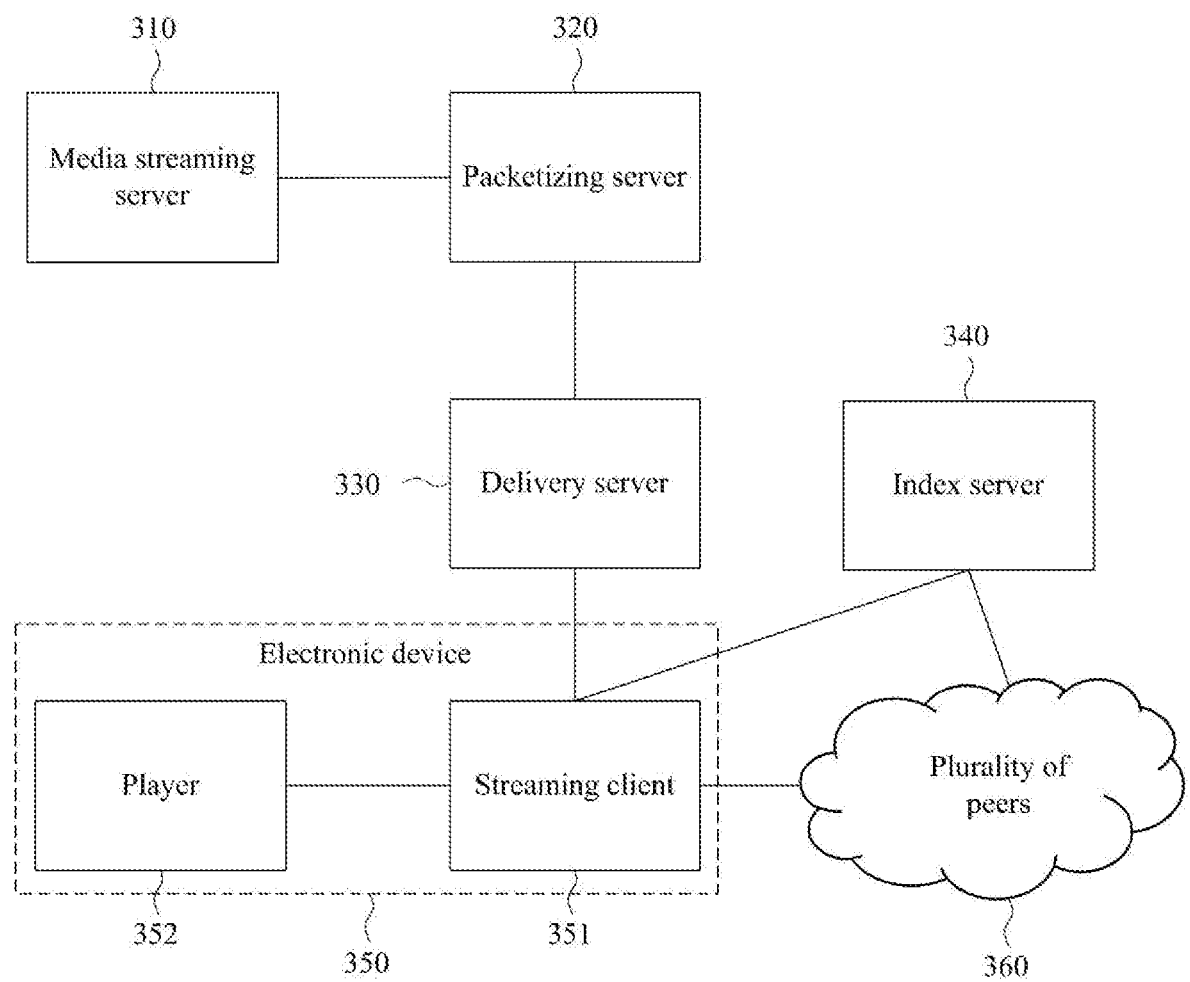
FIG. 3 is a diagram illustrating an example of an entire system environment for a live streaming service according to at least one example embodiment.

FIG. 3 is a diagram illustrating an example of an entire system environment for a live streaming service according to at least one example embodiment. FIG. 3 illustrates a media streaming server 310, a packetizing server 320, a delivery server 330, an index server 340, an electronic device 350, and a plurality of peers 360.

Each of the media streaming server 310, the packetizing server 320, the delivery server 330, and the index server 340 may be a device having the same or similar internal constituent elements to the server 150 described above with FIG. 1 and FIG. 2. Also, each of the plurality of peers 360 and the electronic device 350 may be a device having the same or similar internal constituent elements to the electronic device 110 described above with FIG. 1 and FIG. 2. Although FIG. 3 illustrates that each of the media streaming server 310, the packetizing server 320, the delivery server 330, and the index server 340 is provided as a single item, each server may be provided in a form of a group that includes a plurality of servers. For example, when professional baseball games are to be broadcasted live and in this instance, four games are in progress, a group of four media streaming servers for the respective four media sources may be present and a group of four packetizing servers for the respective four media sources may be present with respect to the four games. Likewise, each of the delivery server 330 and the index server 340 may be provided in a group that includes a plurality of servers depending on a necessity. For example, a required number of servers with respect to each of the delivery server 330 and the index server 340 may be determined based on a performance issue, such as a number of simultaneous connections.

The media streaming server 310 may be a media source device that includes an encoder (not shown) configured to provide live stream data. The packetizing server 320 receives the live stream data from the media streaming server 310, and packetizes or indexes the received live stream data to a piece in order to provide the received live stream data through a peer-to-peer (P2P) service. A method of packetizing or indexing stream data to a piece may use one of known various methods.

The delivery server 330 receives the packetized or indexed piece from the packetizing server 320, buffers the received piece, and transmits a piece about requested live stream data to a corresponding peer 360 in response to a request from the peer 360 of the P2P service. Here, the peer 360 may indicate a client at a live streaming service using the P2P service, and may be configured as a single electronic device. The electronic device that configures the peer may include the electronic device 350 of FIG. 3, and may be a device having the same or similar internal constituent elements to the electronic device 110 described above with FIG. 1 and FIG. 2.

The index server 340 maintains a list of peers 360 and provides search results corresponding to a request from a peer.

An application, such as a streaming client 351, may be installed and executed on the electronic device 350 that configures the peer 360. Here, the electronic device 350 may receive a piece from the delivery server 330 or may receive a piece from other electronic devices that configure other peers, for example, the plurality of peers 360, under control of the executed streaming client 351.

Also, the streaming client 351 executed on the electronic device 350 may transmit live stream data to a player 352 that is another application installed and executed on the electronic device 350 through internal communication with the player 352 at the electronic device 350. Here, the live stream data provided from the streaming client 351 to the player 352 may be data that is combined based on pieces received from the delivery server 330 or at least a portion of the plurality of peers 360.

In this case, the player 352 may play the live stream data provided from the streaming client 351. In response thereto, the live stream data provided from the media streaming server 310 may be played at the electronic device 350, and may be provided to a user of the electronic device 350.

1. Outline of Time Machine Function

A streaming client, for example, the streaming client 351 of FIG. 3, which is installed and executed on an electronic device, for example, the electronic device 350 of FIG. 3, that configures a peer 360 may provide a time machine function about live stream data to a user of the electronic device. As described above, in the related art, a control session for a time machine function is configured for each streaming protocol. According to example embodiments, a time machine control protocol may be in charge of only controlling the time machine function and a streaming protocol between a streaming client and a player may be configured to use a streaming standard supported at the player as is. According to the example embodiments, it is possible to control the time machine function using the same standard regardless of an OS or the player and to remove a dependence of the streaming client on the player. If the time machine control protocol is not supported at the player, the user may view only a live video using a streaming protocol used at an existing player through the player.

2. Terms

A streaming client refers to an application used at a live streaming service. FIG. 3 illustrates the streaming client 351 included in the electronic device 350 as an example. However, as described above, the streaming client 351 may be installed and executed on each of peers 360 that use a live streaming service according to example embodiments.

A control session for a time machine function may indicate a logical connection between the player 352 and the streaming client 351, separate from a streaming session for providing live stream data. The control connection may have no relation to a transmission control protocol (TCP) connection between the player 352 and streaming client 351. A control session connection may not be disconnected even though the TCP connection is disconnected. Inversely, although the TCP connection is continuously maintained, the control session connection may be configured to be disconnected if there is no request for a channel, which will be described below.

Shift may be used as a relative index regarding how previous data is played when using a time machine function. A shift value may be set to zero for a latest live video. If a shift value is greater than zero, it may indicate that shift to the past is made. According to an increase in a shift value, it may indicate that a relatively further previous video is being played. A unit of the shift value may use, for example, millisecond (msec).

A maximum available shift time (max shift, hereinafter, 'mshift') may be used as an index indicating a maximum time machine available time set for a program. A program corresponding to a relatively great value of mshift that is the maximum available shift time may provide relatively longer time machine video data.

A current available shift time (available shift, hereinafter, 'ashift') may be used as an index indicating a maximum time that a user may rewind and view a previous video.

A current shift time (current shift, hereinafter 'cshift') may be used as an index specifying a previous video the user is currently playing.

The terms "shift", "mshift", "ashift", and "cshift" will be further described.

3. Basic Information About Time Machine Control Session 3.1. Message Authorization An authorization is required to use a control session for exchanging a message. A player transmits an authorization request ("/auth") for initiating a control session to a streaming client. If the authorization succeeds at the streaming client, the streaming client transmits key information to be used at the corresponding player as a response to the authorization request. Here, the key information may be included only in the response to "/auth" request. This key may be included in a form of a parameter in the following time machine control request that is transmitted from the player to the streaming client. For example, the key may be included in a form of a character string, such as "k=" query, and thereby streamed. Here, if the character string "k=" query is wrong or absent, the streaming client transmits, to the player, a response (for example, 401 response code in HTTP) indicating that the authorization has failed. This key may be valid while a video is continuously being played at the corresponding player, and may be invalid if a connection request for the same channel occurs at another player. Here, in response to a request incoming from an invalid session, the streaming client may transmit the response (for example, 401 response code in HTTP) indicating that the authorization has failed. The same condition may be applicable to a request for the same channel regardless of whether different browsers are connected to the same channel or whether different windows within the same browser are connected to the same channel. Here, the same condition may not be applied if the respective players are connected to different channels. Sequence of a query character string may be changed.

Figure 4:
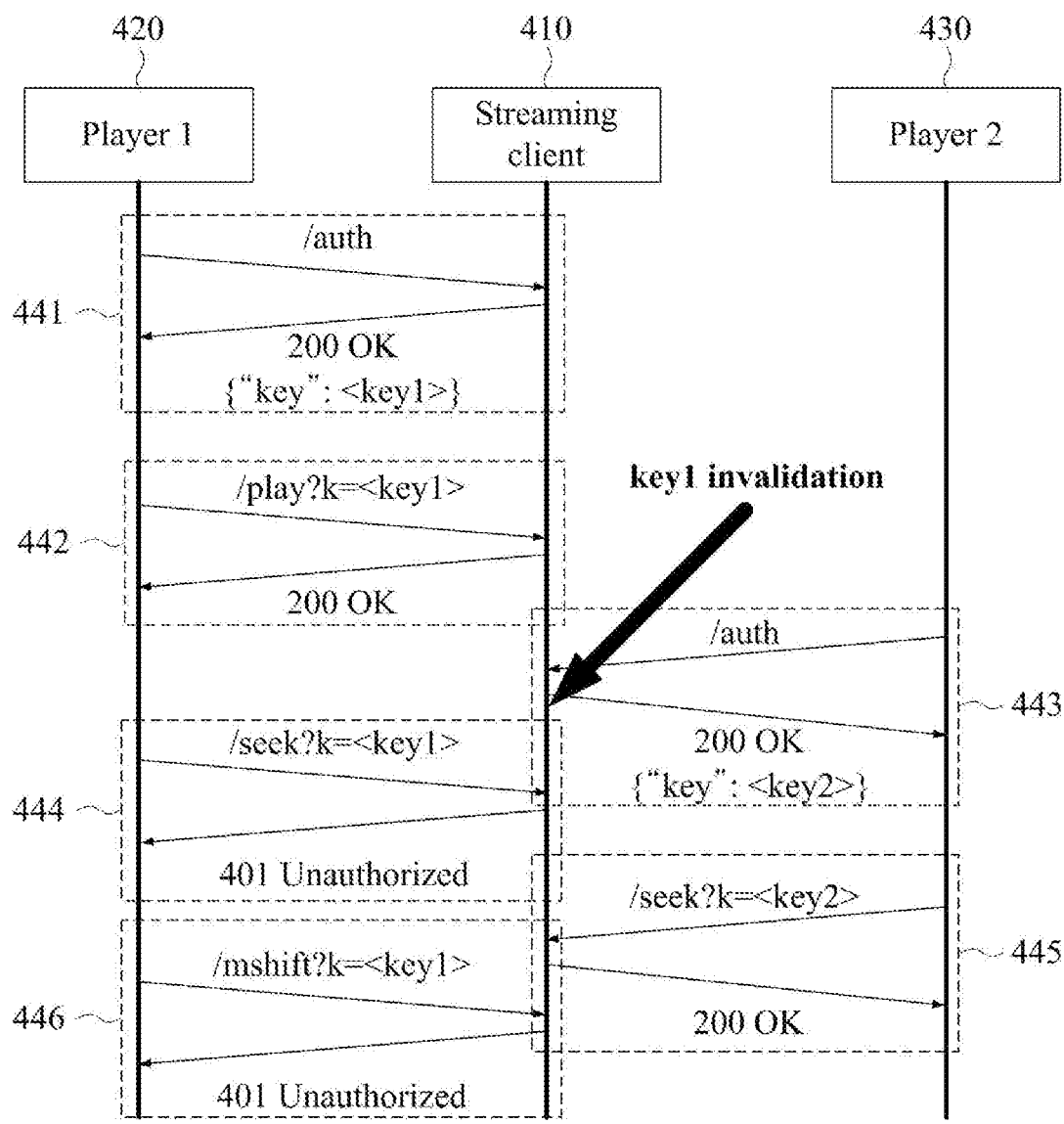
FIG. 4 is a diagram illustrating an example of a control session authorization process according to at least one example embodiment.

FIG. 4 is a diagram illustrating an example of a control session authorization process according to at least one example embodiment. FIG. 4 illustrates a streaming client 410, a first player (player 1) 420, and a second player (player 2) 430. For example, each of the streaming client 410, the first player 420, and the second player 430 may be an application installed and executed on a single electronic device.

A first box 441 indicated with dotted lines indicates a process in which the first player 420 transmits an authorization request (/auth) to the streaming client 410, and the streaming client 410 authorizes the first player 420 and transmits a key <key1> to the first player 420 together with a response (200 OK response code in HTTP). The authorization request (/auth) will be further described below. {"key":<key1>} indicated as key information may indicate that <key1> is provided as a key.

A second box 442 indicated with dotted lines indicates a process in which the first player 420 transmits a play request (/play) to the streaming client 410 using the acquired key <key1> and the streaming client 410 transmits a response (200 OK response code in HTTP) to the first player 420. As described above, the first player 420 may transmit control requests for a time machine function to the streaming client 410 using the key <key1> acquired in response to the authorization request (/auth), and the streaming client 410 may authorize the control requests from the first player 420 through the key <key1> issued from the streaming client 410.

A third box 443 indicated with dotted lines indicates a process in which the second player 430 transmits an authorization request (/auth) to the streaming client 410, and the streaming client 410 authorizes the second player 430 and transmits a key <key2> to the second player 430 together with a response (200 OK response code in HTTP). As described above, due to an occurrence of a connection request for the same channel from another player, the initially issued <key1> may be invalidated.

A fourth box 444 indicated with dotted lines indicates a process in which the first player 420 transmits a seek request (/seek) to the streaming client 410 using the key <key1>. Here, since the key <key1> is invalidated due to an issuance of the key <key2> of the second player 430, the streaming client 410 may transmit, to the first player 420, a response (401 Unauthorized response code in HTTP) indicating that the seek request (/seek) has failed. The seek request (/seek) will be further described below.

A fifth box 445 indicated with dotted lines indicates a process in which the second player 430 transmits a seek request (/seek) to the streaming client 410 using the key <key2>. Since the key <key2> is still valid, the streaming client 410 may transmit, to the second player 430, a response (200 OK response code in HTTP) according to processing the seek request (/seek) from the second player 430.

A sixth box 446 indicated with dotted lines indicates a process in which the first player 420 transmits an information acquirement and session maintain request (/maxshift) to the streaming client 410 using the key <key1> again. Since the key <key1> is invalidated due to an issuance of the key <key2> of the second player 430, the streaming client 410 may transmit a response (401 Unauthorized response code in HTTP) indicating that the information acquirement and session maintain request (/maxshift) has failed to the first player 420. The information acquirement and session maintain request (/maxshift) will be further described below.

3.2. Session Maintain

A TCP connection between a browser or a player and a streaming client may be terminated at any time (for example, HTTP 1.0). That is, since the TCP connection is not continuously maintained, the player needs to transmit, to the streaming client, a time machine control request for a channel currently being viewed by a user within a preset period of time so that the streaming client may verify whether the user is continuously using the corresponding channel. The information acquirement and session maintain request (/maxshift) may be used to maintain a session (and acquire information of a time machine control session. /maxshift may be called at any time to acquire information of the time machine control session while the user is viewing stream data through the channel in response to an authorization success. Here, /maxshift is also one of time machine control requests and thus, in response to transmission of /maxshift, the streaming client may maintain a session with the corresponding player. A time machine control session may have a preset maximum valid time. Accordingly, if no time machine control request is received from the corresponding player during the preset maximum valid time, the streaming client may terminate a time machine control session. Accordingly, to maintain the time machine control session, the player may transmit /maxshift to the streaming client at call intervals less than the maximum valid time.

3.3. HTTP Query Character String

Each of time machine control requests may include an added query character string together with a request for authorizing a time machine control session. A query character string may be defined as shown in the following Table 1.

TABLE 11

| Key | Value |
| --- | --- |
| ref | URL used at a player to connect to a channel (apply URL encoding) |
| k | Key included in a success response to an authorization request (/auth) (for example, <key1> and <key2>) |

All of time machine control requests may include a ref query character string. A request that does not include the ref query character string may be regarded as an unauthorized request. Also, all of time machine control requests excluding an authorization request (/auth) may include a k query character string. A request that does not include the k query character string may be regarded as an unauthorized request. A value of the k query character string may include a key value that is included in a success response to the authorization request (/auth) and thereby transmitted to the player. A time machine control request that includes another key value, for example, an invalid key value, may be regarded as an unauthorized request.

4. Message for Control

A message that is transmitted from a player to a streaming client as the aforementioned time machine control request may use HTTP. As described above, all of messages may include a ref query character string in which URL information currently played is specified. Also, all of messages including an authorization request (/auth) message may further include a k query character string specifying a key value that is included in a success response to the authorization request (/auth) and thereby transmitted. A request message that does not include a query character string may be regarded as an inappropriate request, for example, an unauthorized request. A play-related response may be included in content of a 200 OK message using a JSON format and thereby transmitted from the streaming client to the player. To verify a result about another request excluding a play stop request (/stop), content of a response transmitted from the streaming client needs to be verified.

4.1. Message Summary

A message (request) transmitted from a player to a streaming client for a time machine control request may be defined as shown in the following Table 2.

TABLE 2

| Request | Function | Transmission point in time |
| --- | --- | --- |
| Authorization request (/auth) | Connection authorization | At initial session connection |
| Information acquirement and session maintain request (/maxshift) | Acquire time machine information and maintain a session | Transmittable at any time while a control session is maintained after sending a play request (/play) |
| State change request (/change) | Change of time machine activation state | Transmittable at any time before a connection of a control session is terminated after authorization |
| Play request (/play) | Play request | Should be transmitted before sending a request to a streaming protocol. Streaming progress availability should be verified through a message response. |
| Resume request (/resume) | Resume | Transmittable at any time before a connection is terminated in response to a play stop request (/stop) after play has been initiated in response to a play request (/play) |
| Seek request (/seek) | Seek a play location | |
| Pause request (/pause) | Pause | |
| Play stop request (/stop) | Play end | When stopping a play |

4.2. Connection Authorization (/auth)

As described above, the authorization request (/auth) is a request transmitted from a player at an initial connection to use a time machine function, and a streaming client may use a parameter added to the authorization request (/auth) to verify whether the player transmitting the authorization request (/auth) is an appropriate player. The authorization request (/auth) may be transmitted only once at an initial time with respect to a single time machine control session in which the player is connected to the streaming client.

The authorization request may be defined as shown in the following Table 3.

TABLE 3

| Request | Parameter |
| --- | --- |
| /auth | ref=<representatiye URL>&authKey=<authKey><br>ref: URL used at a player to connect to a channel (apply URL encoding).<br>authKey: authorization key for authorizing a player and a key separate from a key that includes a success response of /auth |

As an example of creating an authorization key (authKey), a value encoded using a method of encoding a secure hash algorithm 1 (SHA-1) return value of "representative URL" specified in a ref query character string to base 64 is created as an authorization key. Here, ':', '=', and '/' used in base 64 may be changed to URL encoded "%3A", "%3D", and "%2F", respectively, to be distinguished from ':', '=', and '/' used in a URL query.

In detail, if the player is to connect to "URL://127.0.0.1:7085/live?cid=49", the authorization key (authKey) may be created through the following process:

1. Create a hash value of URL (hexadecimal number) using SHA-1: EA B0 AC AD 34 F2 86 B2 0F B1 58 54 33 AA D9 69 4E 7F 5C 24

(This value is a reference value and a binary value is encoded using an encoding method of 64 base, instead of encoding a corresponding character string.)

2. Encode using the encoding method of base 64: 6rCsTTyhrIPsVhUM6rZaU5/XCQ=

3. Authorization key (authKey): 6rCsrTTyhrIPsVhUM6rZaU5%2FXCQ%3D ('/' and '=' are changed to "%2F" and "%3D", respectively.)

The authorization key (authKey) for the authorization request (/auth) becomes "6rCsrTTyhrIPsVhUM6rZaU5%2FXCQ%3D" and an actual request may be created as shown in the following Table 4.

TABLE 4

/auth?ref=rtmp%3A%2F%2F127.0.0.1%3A7085%2Flive%3Fcid%3D49&authKey=6rCsrTTyhrIPsVhUM6rZaU5%2FXCQ%3D If the authorization request (/auth) succeeds, a response of the streaming client may be represented as shown in the following Table 5.

TABLE 5

| Key | Description | Value |
| --- | --- | --- |
| key | key that a player should use for playing a channel. | Character string indicating a key value |

The key of Table 5 is an eigenvalue assigned from the streaming client to a corresponding time machine control session, and is a key (value) different from the authorization key (authKey) transmitted from a client, for example, the player to the streaming client for authorization.

If the authorization request (/auth) fails, the streaming client may transmit a "401 Unauthorized" response code to the player without separate message description.

If the authorization request (/auth) succeeds, a key value, such as {"key": "12345678"}, may be included in a response message of the streaming client. Here, "12345678" may be a character string. A request from the player that receives the key may be provided in, for example, a format as shown in Table 6:

TABLE 6

/maxshift?ref=rtmp%3A%2F%2F127.0.0.1%3A7085%2Flive%3Fcid%3D49&k=12345678

4.3. Providable Maximum Time Machine Time Information Request and HTTP Session Maintain A player may fetch maximum time machine time information that may be provided from a streaming client through an information acquirement and session maintain request (/maxshift). The streaming client may respond with only a current state (ex, time machine function ON state or time machine function OFF state) and there is no change in a state of the streaming client (time machine function ON state/time machine function OFF state). As described above, /maxshift may be called at anytime to maintain a control session after receiving a success response to a play request (/play).

The information acquirement and session maintain request (/maxshift) may be defined as shown in the following Table 7.

TABLE 7

| Request | Parameter |
| --- | --- |
| /maxshift | ref=<representatiye URL>&k=<key><br>ref: URL used at a player to connect to a channel (apply URL encoding).<br>k: key included in a success response of authorization request (/auth) and thereby transmitted to a player. |

Information includable in a response transmitted from the streaming client to a success of the information acquirement and session maintain request (/maxshift) may be defined as shown in the following Table 8.

TABLE 8

| Key | Description | Value |
| --- | --- | --- |
| Result | processing result | Success |
| Mshift | maximum available shift time | integer above 0 and unit (msec) |
| Ashift | current available shift time | integer above 0 and unit (msec) |
| Cshift | time shifted to and played at a streaming client | integer above 0 and unit (msec) |
| Onair | whether a channel is on air | 0 or 1 (0: not on air, 1: on air) |
| Timemachine | whether a time machine is in use | "on" or "off" |

For example, if the maximum available shift time is 5 minutes and 3-minute shifted data is being transmitted from the streaming client, the response of the streaming client to the success of the information acquirement and session maintain request (/maxshift) may include the following content:

{"result":"success", "mshift":300000, "ashift":200000, "cshift":180000}

Also, information includable in a response transmitted from the streaming client to a failure of the information acquirement and session maintain request (/maxshift) may be defined as shown in the following Table 9.

TABLE 9

| Key | Description | Value |
| --- | --- | --- |
| result | processing result | Fail |
| error | error code | code value for error occurrence information |

For example, if the information acquirement and session maintain request (/maxshift) fails and an error code is 3, a response of the streaming client may include the following content:

{"result":"fail", "error":3}

4.4. Change of Time Machine Activation State

A user may arbitrarily change an available state of a time machine function. For example, if a capacity issue of a disk occurs while the user is viewing a live program in which the time machine function is available, the user may arbitrarily inactivate the time machine function not to record time machine information anymore. If the time machine function is inactivated, the user may not use the time machine function anymore. However, a player may continuously call an information acquirement and session maintain request (/maxshift).

A state change request (/change) for the time machine function may be defined as shown in the following Table 10.

TABLE 10

| Request | Parameter |
|---------|-----------|
| /change | ref=<representative URL>&k=<key>&enable=<0 or 1> ref: URL used at a player to connect to a channel (apply URL encoding). k: key included in a success response of authorization request (/auth) and thereby transmitted to a player. Enable: availability of a time machine function (0: not use a time machine function, 1: use a time machine function). |

If the state change request (/change) succeeds, the streaming client may transmit a response code, such as 200 OK, to the player without separate message content. Also, if the state change request (/change) fails, the streaming client may transmit a response code, such as 500 Internal Server Error, to the player without separate message content.

4.5. Play Request

A play request (/play) may be transmitted when the player requests the streaming client to initiate playing of live stream data. In response to the play request (/play) received at the streaming client, the streaming client may transmit latest live stream data of a corresponding program, for example, a program corresponding to a URL included in the play request (/play), to the player so that the corresponding program may be played. Although the user changes a channel, the play request (/play) may be used to notify the streaming client that the channel is changed. The streaming client may transmit latest live stream data of a program of the changed channel, for example, a program corresponding to a URL of a new play request (/play) so that the corresponding program may be played. A program key may be issued from a platform of a live streaming service. The play request (/play) may be transmitted to the streaming client for play using the time machine function.

The play request (/play) may be defined as shown in the following Table 11.

TABLE 11

| Request | Parameter |
|---------|-----------|
| /play | ref=<representative URL>&k=<key>&programKey=<programkey>&useTM=<0 or 1>&shiftTime=<initial play location>&pauseStart=<0 or 1> ((Essential parameters)) ref: URL used at a player to connect to a channel (apply URL encoding). k: key included in a success response of authorization request (/auth) and thereby transmitted to a player. programKey: program key issued from a platform of a live streaming service. ((Option parameters)) useTM: availability of a time machine function. If this parameter is not specified, it is basic to use the time machine function (0: not use a time machine function, 1: use a time machine function). shiftTime: an initial play start location (if this value is a negative number, a play starts from a location corresponding to the oldest video). If this value is absent, a play starts at a latest location. |

TABLE 11-continued

| Request | Parameter |
|---------|-----------|
|  | pauseStart: whether to start a channel in a pause state. It can be used to switch a screen quality in a pause state or to start a channel in a pause state (0, start in a general play mode, 1: start in a pause state). |

Information includable in a response to a success of the play request (/play) may be defined as shown in the following Table 12.

TABLE 12

| Key | Description | Value |
|-----|-------------|-------|
| Result | Processing result | success |
| Mshift | maximum available shift time | integer above 0 and unit (msec) |
| Ashift | current available shift time | integer above 0 and unit (msec) |
| Cshift | time shifted to and played at a streaming client | integer above 0 and unit (msec) |
| Onair | whether a channel is on air | 0 or 1 (0: not on air, 1: on air) |
| Timemachine | whether a time machine is in use | "on" or "off" |

Information includable in a response to a failure of the play request (/play) may be defined as shown in the following Table 13.

TABLE 13

| Key | Description | Value |
|-----|-------------|-------|
| result | processing result | Fail |
| error | error code | code value for error occurrence information |

If the player transmits a play request (/play) when starting live streaming for the first time, a response may be slightly delayed due to an operation for acquiring information about a maximum available shift time. In the case of transmitting a play request using a streaming protocol instead of transmitting the play request (/play), the streaming client may play a latest live program at all times by regarding the program as a program that does not use a time machine function. All of the subsequent incoming time machine control requests may be ignored.

4.6. Play at a Previously Paused Location

In response to a pause request (/pause), a streaming client may record, for example, store and manage, a location played by present time or a location transmitted to a player by present time. Such location information may be continuously maintained unless the streaming client is terminated or a time machine control session is disconnected. A resume request (/resume) may be transmitted from the player to the streaming client to request the streaming client to start play from the stored location.

The resume request (/resume) may be defined as shown in the following Table 14.

TABLE 14

| Request | Parameter |
| --- | --- |
| /resume | ref=<representatiye URL>&k=<key><br>ref: URL used at a player to connect to a channe (apply URL encoding).<br>k: key included in a success response of authorization request (/auth) and thereby transmitted to a player. |

Information includable in a response to a success of the resume request (/resume) may be defined as shown in the following Table 15.

TABLE 15

| Key | Description | Value |
| --- | --- | --- |
| Result | processing result | success |
| Mshift | maximum available shift time | integer above 0 and unit (msec) |
| Ashift | current available shift time | integer above 0 and unit (msec) |
| Cshift | time shifted to and played at a streaming client | integer above 0 and unit (msec) |
| Onair | whether a channel is on air | 0 or 1 (0: not on air, 1: on air) |
| Timemachine | whether a time machine is in use | "on" or "off" |

Information includable in a response to a failure of the resume request (/resume) may be defined as shown in the following Table 16.

TABLE 16

| Key | Description | Value |
| --- | --- | --- |
| result | processing result | Fail |
| error | error code | code value for error occurrence information |

4.7. Seek a Play Location

A seek request (/seek) may be used to request a streaming client to shift a current play location in order to use a time machine function. A seek request message may be transmitted regardless of being in a play state or a pause state. The play state or the pause state may be maintained to be alike even after receiving the seek request (/seek). That is, if the streaming client receives the seek request (/seek) during a play, the streaming client may shift a play location and then resume from a shifted location. Also, if the streaming client receives the seek request (/seek) in the pause state, the streaming client may shift a play location and then continuously maintain the pause state. A change of the play location after starting a play using the time machine function may be performed through the seek request (/seek).

The seek request (/seek) may be defined as shown in the following Table 17.

TABLE 17

| Request | Parameter |
| --- | --- |
| /seek | ref=<representative URL>&k=<key>&shift=<value to shift to past (unit: millisecond (msec))><br>ref: URL used at a player to connect to a channel (apply URL encoding).<br>k: key included in a success response of authorization request (/auth) and thereby transmitted to a player.<br>Shift: value indicating to how previous data shift is to be made based on latest live play. 0 may indicate latest live |

TABLE 17-continued

| Request | Parameter |
| --- | --- |
| | stream data (if this value is a negative number, a play starts from a location corresponding to the oldest video).<br>e.g.) If shift is to be made to 5-minute-ago data,<br>/seek?ref=<representative URL>&k=<key>&shift=300000<br>If shift is to be made to latest live stream data,<br>/seek?ref=<representative URL>&k=<key>&shift=0 |

Information includable in a response to a success of the seek request (/seek) may be defined as shown in the following Table 18.

TABLE 18

| Key | Description | Value |
| --- | --- | --- |
| result | processing result | success |
| mshift | maximum available shift time | integer above 0 and unit (msec) |
| ashift | current available shift time | integer above 0 and unit (msec) |
| cshift | time shifted to and played at a streaming client | integer above 0 and unit (msec) |
| onair | whether a channel is on air | 0 or 1 (0: not on air, 1: on air) |
| timemachine | whether a time machine is in use | "on" or "off" |

Information includable in a response to a failure of the seek request (/seek) may be defined as shown in the following Table 19.

TABLE 19

| Key | Description | Value |
| --- | --- | --- |
| result | processing result | Fail |
| error | error code | code value for error occurrence information |

4.8. Pause

A pause request (/pause) may be used to pause a play at a current transmission location of a streaming client. If a control session for a time machine function is not terminated, the streaming client may store this location and may resume a play from the stored location in response to a resume request (/resume).

The resume request (/pause) may be defined as shown in the following Table 20.

TABLE 20

| Request | Parameter |
| --- | --- |
| /pause | ref=<representatiye URL>&k=<key><br>ref: URL used at a player to connect to a channel (apply URL encoding).<br>k: key included in a success response of authorization request (/auth) and thereby transmitted to a player. |

Information includable in a response to a success of the pause request (/pause) may be defined as shown in the following Table 21.

TABLE 21

| Key | Description | Value |
| --- | --- | --- |
| result | processing result | success |
| mshift | maximum available shift time | integer above 0 and unit (msec) |
| ashift | current available shift time | integer above 0 and unit (msec) |
| cshift | time shifted to and played at a streaming client | integer above 0 and unit (msec) |
| onair | whether a channel is on air | 0 or 1 (0: not on air, 1: on air) |
| timemachine | whether a time machine is in use | "on" or "off" |

Information includable in a response to a failure of the pause request (/pause) may be defined as shown in the following Table 22.

TABLE 22

| Key | Description | Value |
| --- | --- | --- |
| result | processing result | Fail |
| error | error code | code value for error occurrence information |

4.9. Session Close

In the case of terminating a player, a play stop request (/stop) may be used so that a streaming client deletes all of information.

The play stop request (/stop) may be defined as shown in the following Table 23.

TABLE 23

| Request | Parameter |
| --- | --- |
| /stop | ref=<representatiye URL>&k=<key><br>ref: URL used at a player to connect to a channel (apply URL encoding).<br>k: key included in a success response of authorization request (/auth) and thereby transmitted to a player. |

The streaming client may transmit a 200 OK response code without content to the player regardless of a success/failure of the play stop request (/stop).

Figure 5:
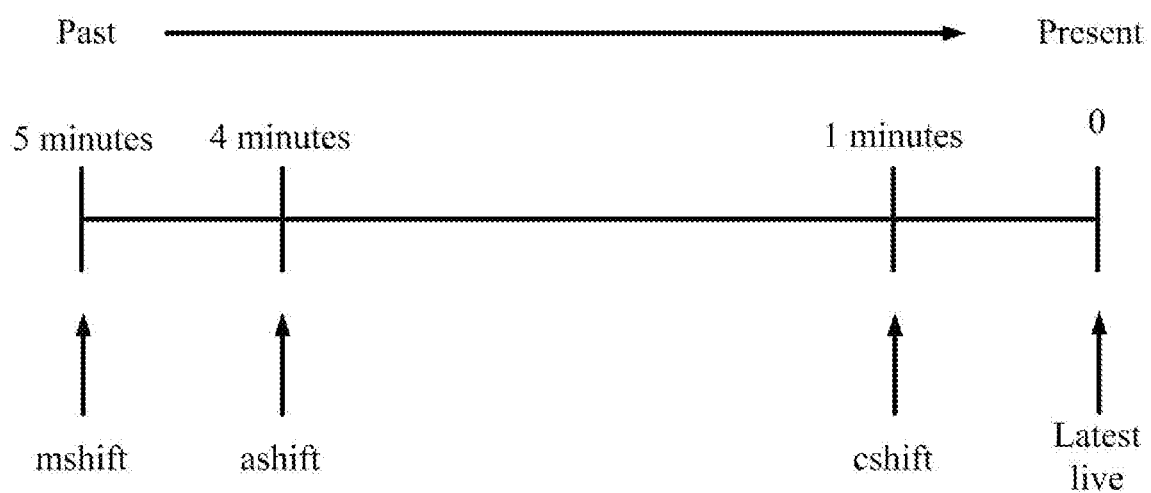
FIG. 5 illustrates an example of explaining shift values according to at least one example embodiment.

FIG. 5 illustrates an example of explaining shift values according to at least one example embodiment. FIG. 5 illustrates a relationship among a maximum available shift time (mshift), a current available shift time (ashift), and a current shift time (cshift) transferred as result values of a time machine control request in an example in which a maximum available shift time that is a time machine time of a program is set as 5 minutes and a user is viewing a one-minute-ago video in a state in which 4 minutes has passed after the program was started.

The maximum available shift time (mshift) refers to a time machine available time set to this program, and may be fixed to 5 minutes in this example. Here, although the maximum available shift time (mshift) is 5 minutes, the elapse time after start of the program is 4 minutes, which is less than 5 minutes. Thus, a time machine function of 4 minutes or more cannot be provided. The current available shift time (ashift) may be used to inform an available shift time at a current point in time separate from the maximum available shift time. That is, the current available shift time (ashift) may indicate a maximum time of a time machine available time that may be currently provided from the streaming client. The program for previous time than the current available shift time (ashift) cannot be provided. If the elapse time after a program is started is greater than the time machine available time, a value of the maximum available shift time (mshift) and a value of the current available shift time (ashift) become equal. Also, that the current shift time (cshift) is 1 minute may indicate that the user is viewing a 1-minute-ago video based on the latest live program. The current shift time (cshift) is not changed if the latest live program is in progress and the user does not shift a play location. That is, in the example of FIG. 5, the user may view a video at a time difference of 1 minute from an actual broadcast time.

6. Program End Processing

In an example in which a live program is terminated and a player is to immediately end the program in a state in which a user is viewing a previous video using a time machine function, the user may not view the last video of the program. For example, if the live program is terminated in a state in which the user is viewing the video at a time difference of 1 minute from the actual broadcast time in FIG. 5 and the player is to immediately end the program, the user may not view the video corresponding to the last one minute. Accordingly, although the actual program is terminated, there is a need to delay program end processing by a preset period of time.

In a time machine control session, a response to a time machine control request may include "onair" and information about a program end time may be provided through combination of values of "onair" and "cshift".

Time Machine Information on Air

If a value of "onair" is 1 and a user is viewing a shifted live video using a time machine function, a value of 'cshift' indicates a time in the past the user has shifted to and returns a value greater than 0. Also, a value of 'cshift' on air returns the time in the past the user has shifted to using a fixed value.

Time Machine Information at a Program End

If a program ends, a value of 'onair' is 0 and a value of 'cshift' further decreases to become 0 with the progress of a play. If this value becomes 0, it indicates that the transmission of a video corresponding to a program end time is completed. Accordingly, if a value of 'onair' and a value of 'cshift' simultaneously become 0, there is no video to be played at the player and thus, a play may be stopped.

For example, if the user was viewing the latest live video, a value of 'cshift' returns 0. Thus, a program may be immediately terminated at a point in time at which the value of 'onair' is changed to 0. Meanwhile, if the user was viewing a one-minute-shifted (a value of cshift is 60,000 msc) video, the value of 'cshift' decreases from 60,000 in real time from a point in time at which the value of 'onair' is changed to 0. Here, if one minute has elapsed, the value of 'cshift' becomes 0 and the player may terminate the program.

Figure 6:
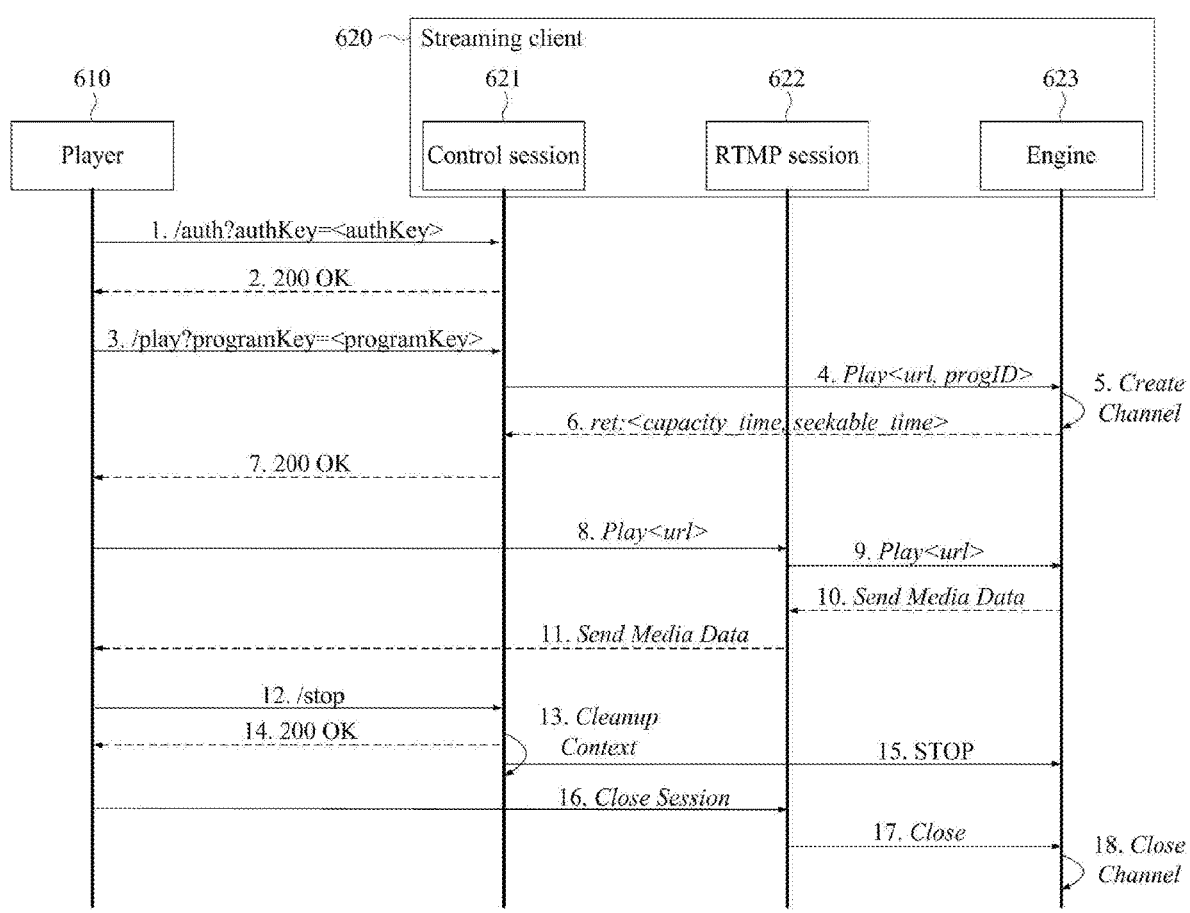
FIG. 6 is a flowchart illustrating an example of a process of processing an initial play request and a play stop request according to at least one example embodiment.

FIG. 6 is a flowchart illustrating an example of a process of processing an initial play request and a play stop request according to at least one example embodiment. FIG. 6 illustrates a message flow between a player 610 and a streaming client 620. Referring to FIG. 6, the streaming client 620 includes a control session 621, a real-time messaging protocol (RTMP) session 622, and an engine 623. The control session 621 may be a session set for communication between the player 610 and the streaming client 620 using a time machine control protocol for providing a time machine function, the RTMP session 622 may be a session set for communication between the player 610 and the streaming client 620 using a streaming protocol for an actual streaming service. Substantially, the control session 621 may be a software function of the streaming client 620 for providing the time machine function through the control session 621, and the RTMP session 622 may be a software function of the streaming client 620 for providing the streaming service.

1. /auth?authKey=<authKey> process may be a process in which the player 610 transmits an authorization request (/auth) to the streaming client 620 through the control session 621. Here, the authorization request (/auth) may include an authorization key (authKey).

2. 200 OK process may be a process in which the streaming client 620 transmits a response to the authorization request (/auth) to the player 610 through the control session 621. The streaming client 620 may authorize the player 610 using the authorization key (authKey) included in the authorization request (/auth). If the authorization of the player 610 succeeds, the streaming client 620 may transmit a success response (200 OK response code) to the player 610. If the authorization of the player 610 fails, the streaming client 620 may transmit a failure response (401 Unauthorized response code) to the player 610.

3. /play?programKey=<programKey> process may be a process in which the player 610 transmits a play request (/play) to the streaming client 620 through the control session 621. The program key (programKey) is described above and thus, a further description related thereto is omitted. A URL included in the play request (/play) is omitted.

4. Play<url, progID> process may be a process of requesting the engine 623 of the streaming client 620 for play in order to process the play request (/play) received through the control session 621. "url" may correspond to the URL included in the play request (/play), and "progID" may correspond to the program key (programKey) included in the play request (/play).

5. Create channel process may be a process of creating a channel for a requested program at the engine 623. For example, the engine 623 may control an electronic device including the player 610 and the streaming client 620 to connect to the requested "url" and to request live stream data corresponding to "progID", and may create a channel for the live stream data.

6. ret<capacity_time, seekable_time> process may be a process in which the engine 623 transfers a maximum available shift time (capacity_time) and a current available shift time (seekable_time) about corresponding live stream data to the control session 621. "capacity_time" and "seekable_time" may be processed as "mshift" and "ashift" at the control session 621, respectively. Although it is not illustrated in FIG. 6, information about "cshift" may also be transferred.

7. 200 OK process may be a process in which the streaming client 620 transmits a success response to the play request (/play) through the control session 621. Here, "mshift" and "ashift" (and "cshift") may be included in the success response and thereby transmitted.

8. Play<url> process may be a process in which the player 610 requests the streaming client 620 to play a program through the RTMP session 622 using a streaming protocol.

9. Play<url> process may be a process in which the request for playing the program is transferred to the engine 623 through the RTMP session 622.

10. Send Media Data process and 11. Send Media Data process may be processes in which the engine 623 transmits data for actual streaming to the player 610 through the RTMP session 622. The player 610 may play the program based on the received data, and may control the electronic device to display the program being played on a display of the electronic device.

12. /stop process may be a process in which the player 610 transmits a play stop request (/stop) to the streaming client 620 through the control session 621.

13. Cleanup Context process may be a process in which the streaming client 620 deletes all of time machine information for a corresponding session.

14. 200 OK process may be a process in which the streaming client 620 transmits a success response to the play stop request (/stop) to the player 610 through the control session 621.

15. STOP process may be a process of requesting the engine 623 to stop a play.

16. Close Session process may be a process in which the player 610 requests the streaming client 620 to substantially close the session through the RTMP session 622.

17. Close process may be a process in which the RTMP session 622 instructs the engine 623 to close the session according to the streaming protocol.

18. Close Channel process may be a process in which the engine 623 closes the channel.

As described above, since the time machine control protocol and the streaming protocol are completely separated and processed, the streaming client 620 may provide the time machine function using the time machine control protocol regardless of the streaming protocol supported at the player 610.

Figure 7:
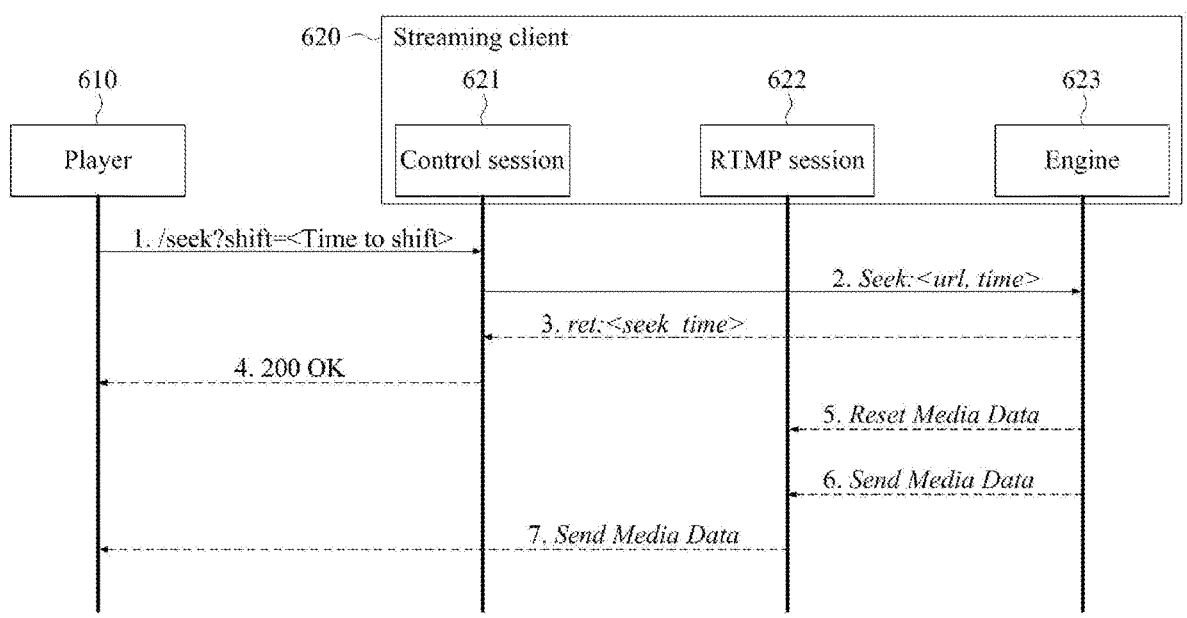
FIG. 7 is a flowchart illustrating an example of a process of processing a seek request during a play according to at least one example embodiment.

FIG. 7 is a flowchart illustrating an example of a process of processing a seek request during a play according to at least one example embodiment.

1. /seek?shift=<time to shift> process may be a process in which the player 610 transmits a seek request (/seek) to the streaming client 620.

2. Seek:<url, time> process may be a process in which the streaming client 620 requests the engine 623 for substantial seeking through the control session 621.

3. ret<seek_time> process may be a process in which the engine 623 provides a seek result. Here, "seek_time" may correspond to "cshift".

4. 200 OK process may be a process in which the streaming client 620 transmits a success response to the seek request (/seek) to the player 610 through the control session 621. Here, "cshift" corresponding to "seek_time" may be included in a success response and thereby transmitted to the player 610.

5. Reset Media Data process may be a process in which the engine 623 resets stream data to play a program from a shifted play location through the RTMP session 622.

6. Send Media Data process and 7. Send Media Data process may be processes in which the engine 623 transmits data to the player 610 via the RTMP session 622 from a reset play location.

According to the example embodiment of FIG. 7, the time machine control protocol and the streaming protocol may be completely separated and processed.

Figure 8:
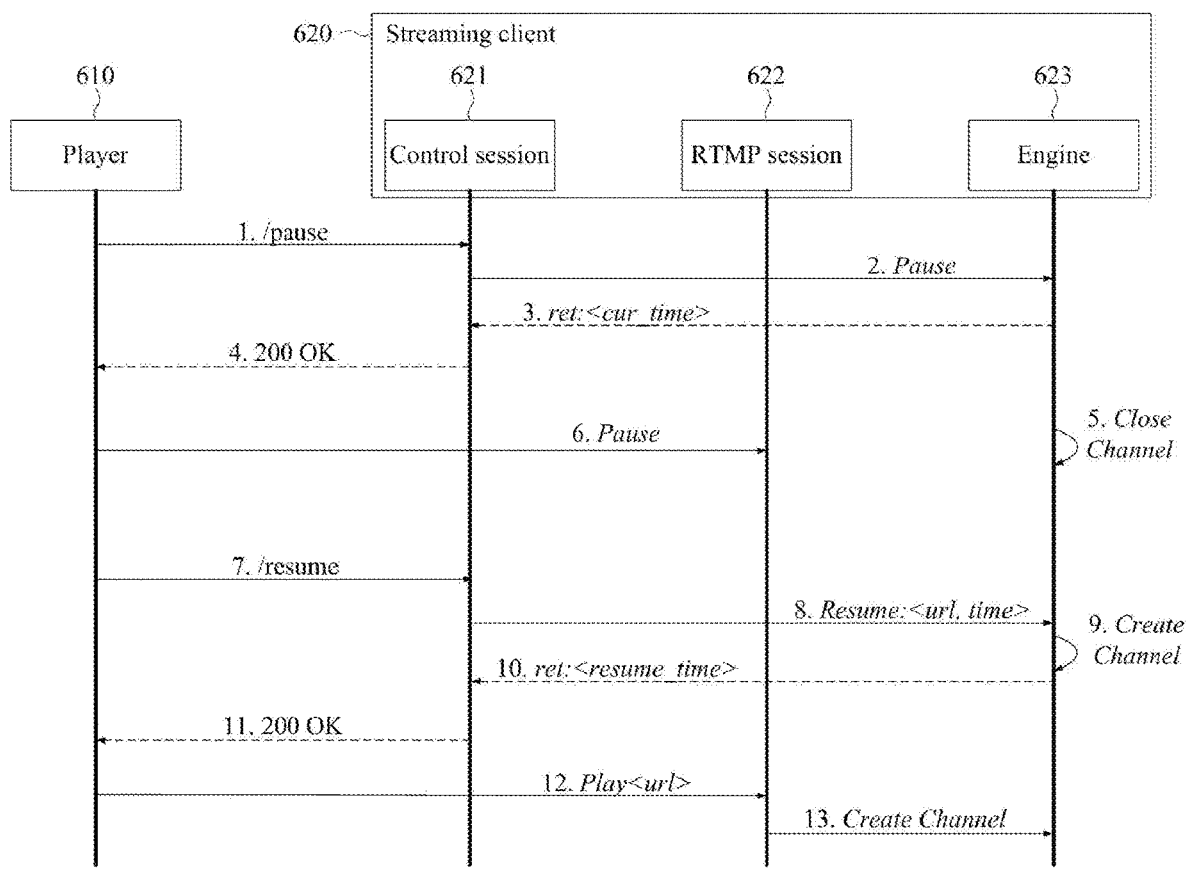
FIG. 8 is a flowchart illustrating an example of a process of processing a pause request and a resume request according to at least one example embodiment.

FIG. 8 is a flowchart illustrating an example of a process of processing a pause request and a resume request according to at least one example embodiment.

1. /pause process may be a process in which the player 610 transmits a pause request (/pause) for a program being played to the streaming client 620 through the control session 621.

2. Pause process may be a process in which the control session 621 instructs the engine 623 to pause the program being played.

3. ret<cur_time> process may be a process in which the engine 623 provides a processing result about the pause request (/pause). Here, "cur_time" may be a value that indicates a currently paused play location as a time. The control session 621 may store and manage "cur_time".

4. 200 OK process may be a process in which the streaming client 620 transmits a success response to the pause request (/pause) to the player 610 through the control session 621.

5. Close Channel process may be a process in which the engine 623 closes a channel. If the channel is connected, data may be continuously received even in a pause state, which may affect an amount of network data used at a mobile terminal. According to the example embodiments, it is possible to prevent reception of data by closing the channel.

6. Pause process may be a process in which the player 610 requests the streaming client 620 to pause the program using a streaming protocol through the RTMP session 622.

7. /resume process may be a process in which the player 610 transmits a resume request (/resume) for the paused program to the streaming client 620 through the control session 621.

8. Resume:<url, time> process may be a process in which the control session 621 requests the engine 623 to resume playing of the program from "cur_time". "url" may correspond to a URL of the program requested to be paused and time may correspond to "cur_time" stored and managed in the control session 621.

9. Create Channel process may be a process in which the engine 623 creates a channel to resume the program.

10. ret<resume_time> process may be a process in which the engine 623 provides a processing result about the resume request (/resume). Here, "resume_time" may indicate a value of a play location at which the program is resumed.

11. 200 OK process may be a process in which the streaming client 620 transmits a success response to the resume request (/resume) to the player 610 through the control session 621. "resume_time" may correspond to "cshift".

12. Play<url> process may be a process in which the player 610 requests the streaming client 620 to play the program through the RTMP session 622 using the streaming protocol. Also, 13. Create Channel process may be a process in which the RTMP session 622 requests the engine 623 to create a channel.

Figure 9:
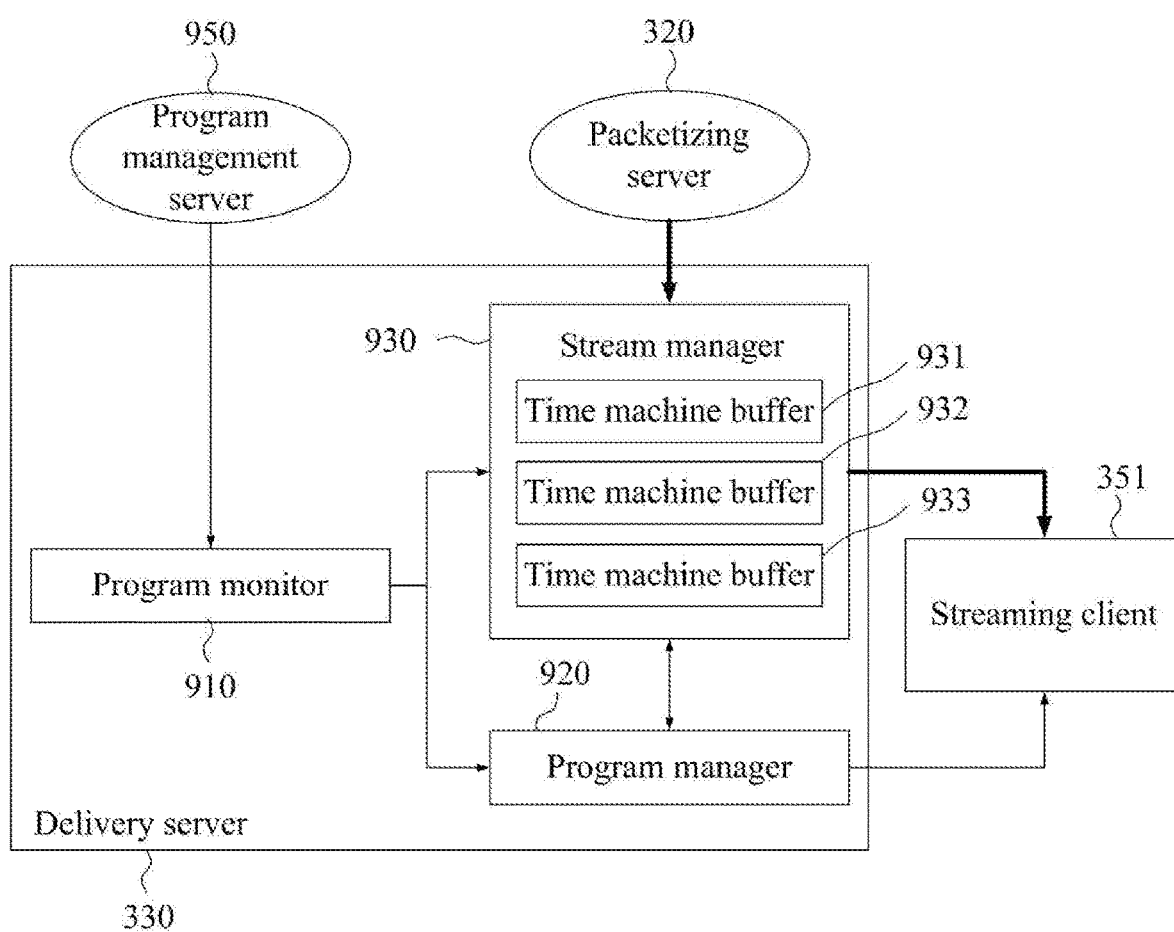
FIG. 9 is a diagram illustrating a configuration of a delivery server according to at least one example embodiment.

FIG. 9 is a diagram illustrating a configuration of the delivery server 330 according to at least one example embodiment. As described above, the delivery server 330 may receive pieces from the packetizing server 320 and may transfer the pieces to the electronic devices 350 that include peers 360, for example, the streaming client 351. Also, the delivery server 330 may receive a program schedule from a program management server 950 and may operate according to the received program schedule. To this end, the delivery server 330 includes a program monitor 910, a program manager 920, and a stream manager 930.

The program monitor 910 collects a program schedule as schedule information about a broadcast program from the program management server 950.

The program manager 920 analyzes the program schedule and determines whether to operate a time machine buffer about a specific channel or a specific broadcast program.

The stream manager 930 manages the time machine buffer about the specific channel or the specific broadcast program based on an analysis result of the program manager 920.

For example, the program manager 920 may request the stream manager 930 to manage a time machine buffer B, such as one of time machine buffers 931, 932, 933, about a broadcast program A currently being broadcasted live. Here, the stream manager 930 may store and manage a piece about the broadcast program A among pieces transmitted from the packetizing server 320, in the time machine buffer B.

Accordingly, the streaming client 351 may stably provide a time machine function about the broadcast program A using pieces stored in the time machine buffer B. Also, the delivery server 330 may have no need to manage a time machine buffer about all of broadcast programs or all of channels. Thus, the delivery server 330 may further efficiently manage live stream data using a time machine buffer only about a broadcast program currently being broadcasted live or to which the time machine function is to be provided.

Also, the program manager 920 may determine whether to operate the time machine buffer about the broadcast program and may transmit information about the broadcast program using the time machine buffer to the streaming client 351. For example, the program manager 920 may provide users with information about the broadcast program that is using the time machine buffer by transmitting the aforementioned program key (programKey) to the streaming client 351.

Figure 10:
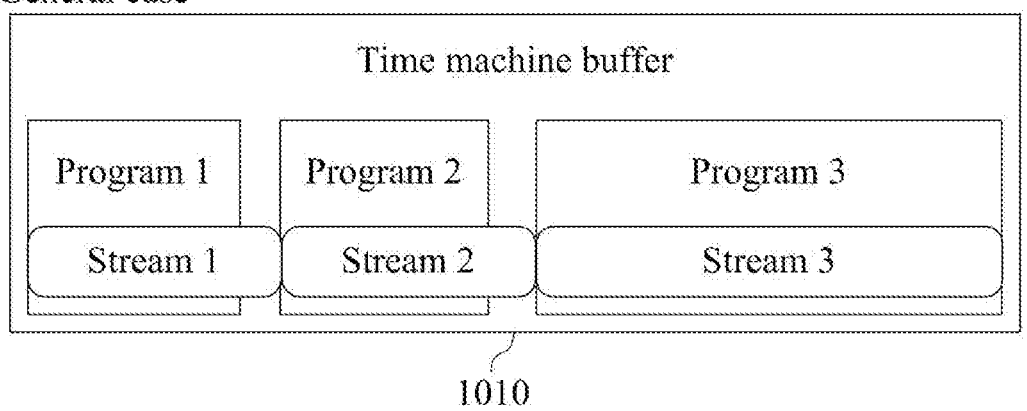
FIG. 10 is a diagram illustrating an example of using a time machine buffer according to at least one example embodiment.
Figure 10:
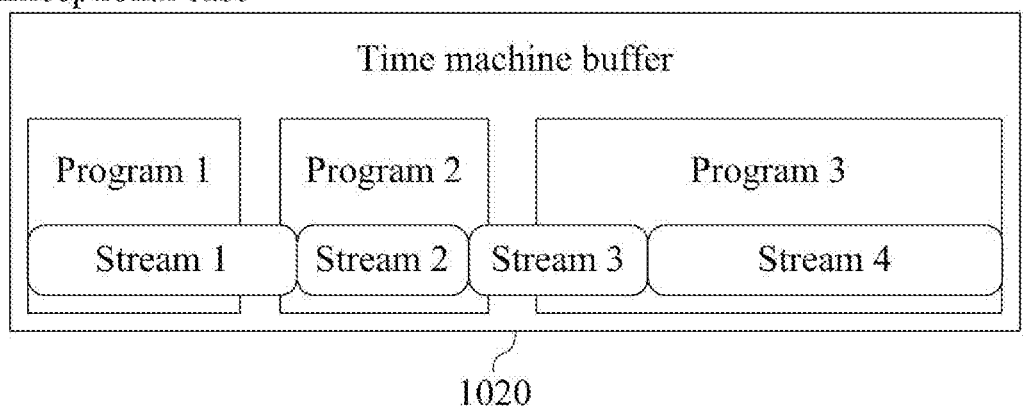

FIG. 10 is a diagram illustrating an example of using a time machine buffer according to at least one example embodiment. FIG. 10 illustrates an example of storing and managing stream data of a plurality of programs, for example, programs 1, 2, and 3 in a single time machine buffer, such as one of time machine buffers 931, 932, 933, for example, each of time machine buffers 1010 and 1020. In this example, the delivery server 330 may classify and thereby store and manage stream data, for example, pieces, for a single time machine buffer for each broadcast program and each stream based on the aforementioned program schedule. For example, stream data of a specific broadcast program may be matched to a program key (programKey) of the broadcast program and thereby stored.

For example, in a general case, the time machine buffer 1010 may classify stream data into stream data for program 1 and stream data for program 2 based on a program schedule, for example, a broadcast time and the like. Accordingly, in the general case, it is possible to identify stream data for program 2 from among a plurality of sets of stream data stored and managed in the time machine buffer 1010. Thus, it is possible to clearly determine by which previous point of program 2 a play location can be shifted using the time machine function.

Also, if a stream connection is disconnected based on a network situation, stream data for a single broadcast program may be provided through a plurality of streams as in the time machine buffer 1020 of an exceptional case. For example, in the time machine buffer 1020 of the exceptional case, program 2 may be provided through different streams, for example, stream 1, stream 2, and stream 3, based on play locations, respectively. Here, the different streams may correspond to different channels. Accordingly, when providing stream data using a time machine function for program 2, stream data is to be provided using a different stream based on a play location. The time machine buffers 1010 and 1020 according to the example embodiments may classify and thereby store and manage stream data, for example, pieces, for each broadcast program and for each stream based on the aforementioned program schedule. Accordingly, it is possible to accurately specify stream data for each broadcast program and for each stream.

The streaming client 351 may accurately receive, from a single time machine buffer, a data stream of a specific broadcast program or a data stream of a program of a specific channel that the streaming client 351 is to request the delivery server 330 for.

Figure 11:
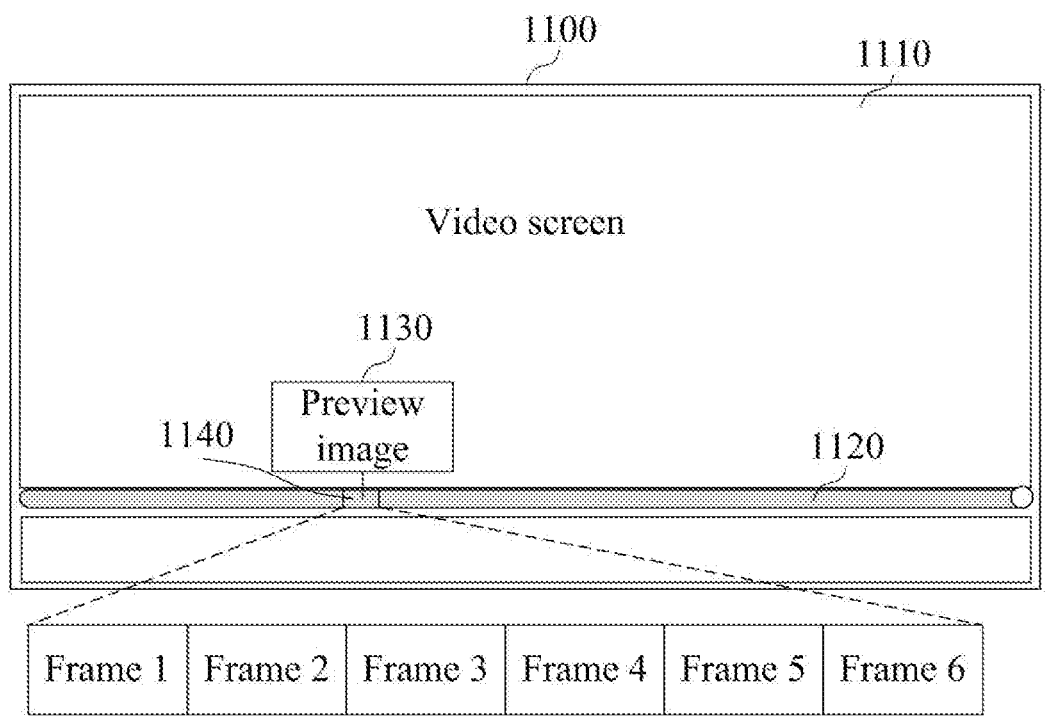
FIG. 11 illustrates an example of a screen for providing a preview function in response to seeking using a time machine function according to at least one example embodiment.

FIG. 11 illustrates an example of a screen for providing a preview function in response to a progress of a seek using a time machine function according to at least one example embodiment. FIG. 11 illustrates an example of a display screen 1100 for a live streaming service. A video screen 1110 of a broadcast program being streamed may be displayed on the display screen 1100. A bar 1120 of the display screen 1100 may be a user interface for designating a play location in a time machine function. In response to a user selection on a specific location of the bar 1120, for example, a mouse-over at a specific location of the bar 1120 in a PC environment, a preview image 1130 associated with the selected location may be provided. The preview image 1130 may be provided in a snapshot form of a selected frame.

Here, an area of the bar 1120 may be divided into a plurality of sections. The preview image 1130 may correspond to a first frame among frames of a section that includes a specific location. For example, if a location selected by the user is included in a specific section 1140 among the plurality sections set to the bar 1120, a streaming client may provide frame 1 that is the first frame among frames corresponding to the specific section 1140 as the preview image 1130 instead of seeking a frame that is accurately matched at the selected location. Accordingly, when providing a time machine function in a live broadcast program, the first frame of a relatively easily seekable section may be provided instead of accurately seeking a past specific frame. Thus, it is possible to reduce a calculation amount.

Figure 12:
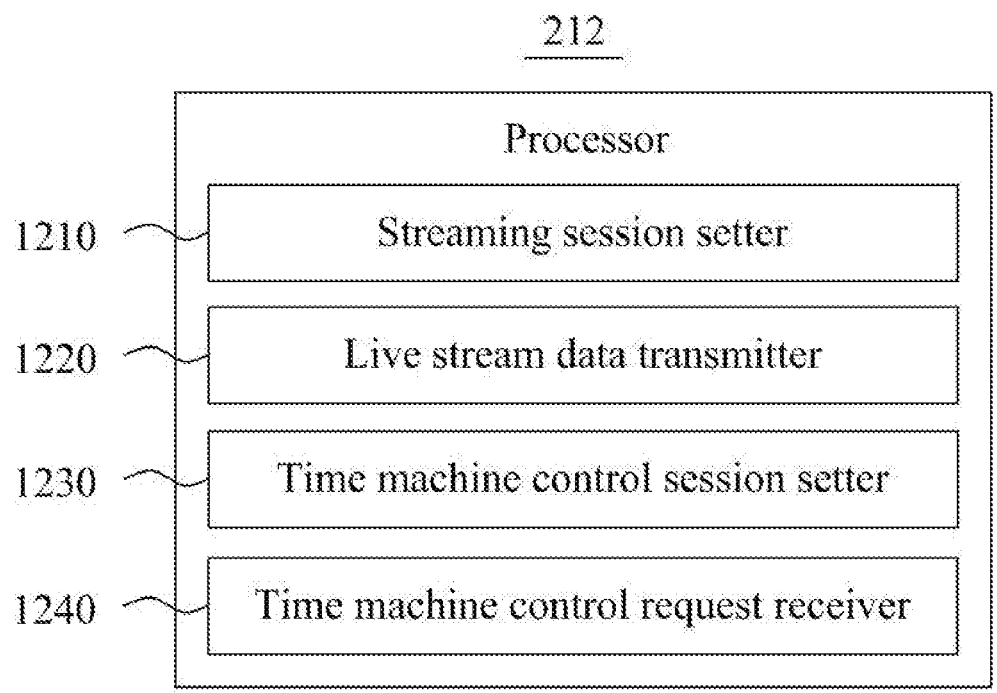
FIG. 12 is a block diagram illustrating an example of constituent elements includable in a processor of an electronic device according to at least one example embodiment.
Figure 13:
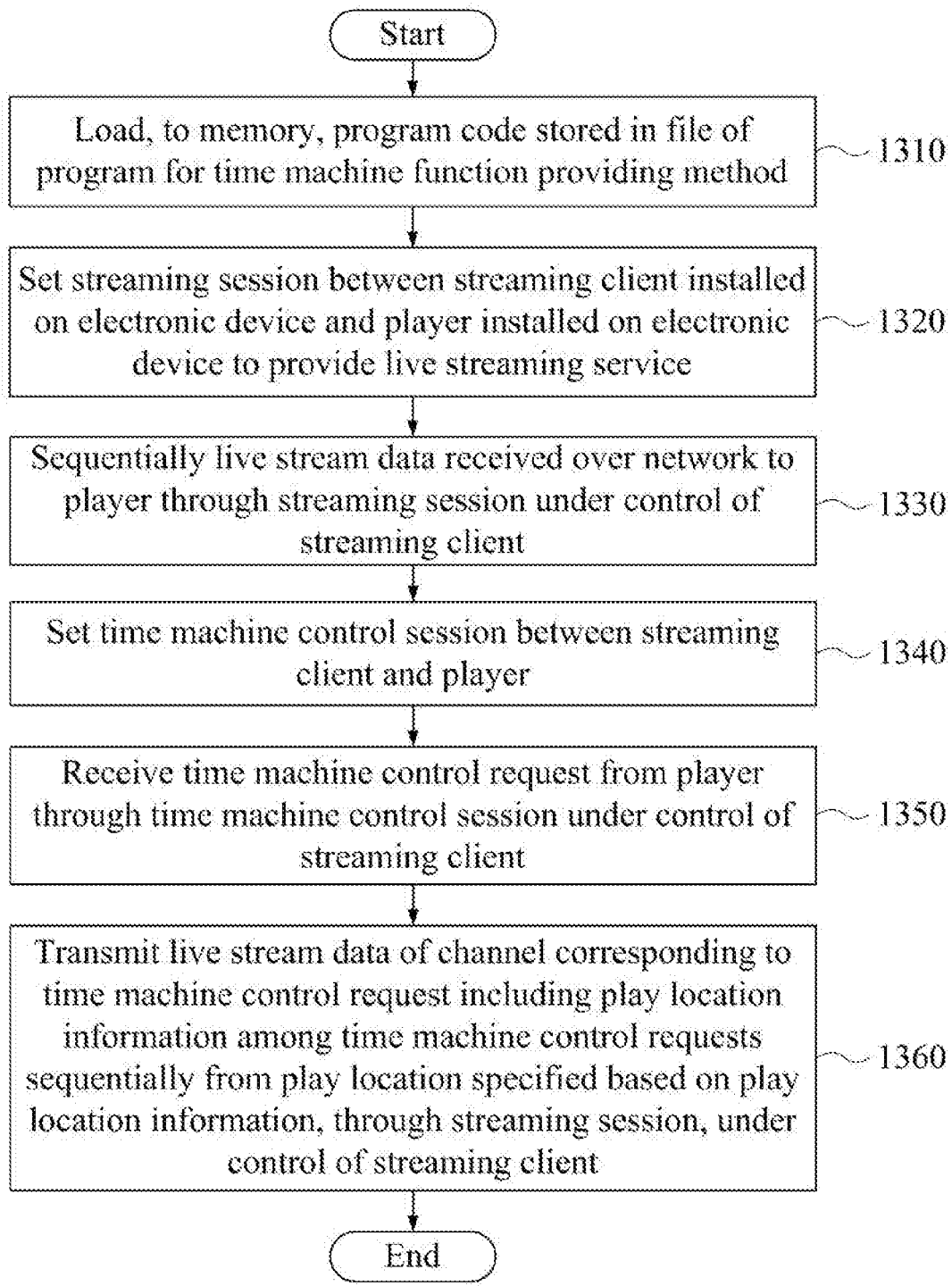
FIG. 13 is a flowchart illustrating an example of a time machine function providing method performed at an electronic device according to at least one example embodiment.

FIG. 12 is a block diagram illustrating an example of constituent elements includable in a processor of an electronic device according to at least one example embodiment, and FIG. 13 is a flowchart illustrating an example of a time machine function providing method performed at an electronic device according to at least one example embodiment.

Referring to FIG. 12, the processor 212 of the electronic device 110 includes a streaming session setter 1210, a live stream data transmitter 1220, a time machine control session setter 1230, and a time machine control request receiver 1240. The processor 212 and the constituent elements of the processor 212 may control the electronic device 110 to implement operations 1310 through 1360 included in the time machine function providing method of FIG. 13. Here, the processor 212 and the constituent elements of the processor 212 may be configured to execute instructions according to a code of at least one program and a code of an OS included in the memory 211. Here, the constituent elements of the processor 212 may be representations of different functions executed at the processor 212. For example, the streaming session setter 1210 may be used as a functional representation of an operation of controlling the electronic device 110 so that the processor 212 sets a streaming session in response to the instruction.

In operation 1310, the processor 212 may load, to the memory 211, a program code stored in a file of a program for the time machine function providing method. For example, in response to an execution of the program installed on the electronic device 110, the processor 212 may control the electronic device 110 to load the program code from the file of the program to the memory 211.

Here, the processor 212 and the streaming session setter 1210, the live stream data transmitter 1220, the time machine control session setter 1230, and the time machine control request receiver 1240 included in the processor 212 may execute operations 1320 through 1360 by executing a portion, for example, an instruction, corresponding to the program code loaded to the memory 211. The processor 212 and the constituent elements of the processor 212 may also control the electronic device 110 to implement operations 1320 through 1360. For example, the processor 212 may control the communication module 213 included in the electronic device 110 to communicate with another electronic device or another server.

In operation 1320, the streaming session setter 1210 may set a streaming session between the streaming client 351 installed on the electronic device 110 and the player 352 installed on the electronic device 110 to provide a live streaming service. Each of the streaming client 351 and the player 352 may be installed and executed on the electronic device 110 as an application.

In operation 1330, the live stream data transmitter 1220 may sequentially transmit live stream data received over a network to the player 352 through the streaming session under control of the streaming client 351.

In operation 1340, the time machine control session setter 1230 may set a time machine control session between the streaming client 351 and the player 352.

In operation 1350, the time machine control request receiver 1240 may receive a time machine control request from the player 352 through the time machine control session under control of the streaming client 351.

In operation 1360, the live stream data transmitter 1220 may transmit live stream data of a channel corresponding to a time machine control request that includes play location information among time machine control requests sequentially from a play location specified based on play location information, through the streaming session, under control of the streaming client 351.

A data transmission between the streaming client 351 and the player 352 through the streaming session and a data transmission between the streaming client and the player through the time machine control session may proceed based on different separate protocols, respectively.

According to some example embodiments, in the time machine function providing method, the streaming client 351 may receive an authorization request from the player 352 through the time machine control session. Here, the authorization request may include an authorization key and information used to specify live stream data or a channel. In this case, in the time machine function providing method, the streaming client 351 may authorize the player 352 using the authorization key. If authorization of the player 352 succeeds, the streaming client 351 may include an eigenvalue assigned to the time machine control session in a response to the authorization request as a session key and transmit the response to the player. Also, in the time machine function providing method, the streaming client 351 may verify whether the time machine control request includes the session key and may authorize the time machine control request. Also, in the time machine function providing method, if the streaming client authorizes another player 352 in response to an authorization request from the other player 352 installed on the electronic device 350, the streaming client may transmit a session key that includes an eigenvalue assigned to a time machine control session set with the other player to the other player and may invalidate a session key of an existing player.

According to some example embodiment, in the time machine function providing method, the streaming client 351 may receive an information acquirement and session maintain request from the player 352 through the time machine control session, and may include time machine time information about live stream data that is being provided to the player through the streaming session, in response to the information acquirement and session maintain request, and may transmit the response to the player through the time machine control session. Here, the time machine time information may include a maximum available shift time preset for each set of live stream data as an index indicating a level capable of seeking previous data based on latest data of the live stream data, a current available shift time that is an index indicating a level capable of seeking previous data at a current point in time based on the latest data, and a current shift time that is an index specifying previous data currently being played through a time machine function based on the latest data.

According to some example embodiments, in the time machine function providing method, the streaming client 351 may receive channel identification information and a play request that includes a program key for identifying live stream data of a specific program in live stream data of a channel identified based on the channel identification information, through the time machine control session, and may sequentially transmit, to the player 352, live stream data identified through the program key in the live stream data of the channel identified based on the channel identification information. Here, the live stream data may be transmitted from a delivery server to the electronic device over the network, and the live stream data may be matched for each channel and each program based on the channel identification information and the program key, and thereby stored in a time machine buffer included in the delivery server 330. Also, the play request may further include information about at least one of availability of a time machine function, an initial play start location of the identified live stream data, and whether to start a channel in a pause state.

According to some example embodiments, in the time machine function providing method, the streaming client 351 may store a currently playing location in the live stream data in response to receiving a pause request through the time machine control session, and suspend a transmission of the live stream data, and may sequentially transmit the live stream data to the player 352 from the stored location, in response to receiving a resume request through the time machine control session. Here, a connection of the channel may be terminated in response to the pause request and may be resumed in response to the resume request.

According to some example embodiments, in the time machine function providing method, the streaming client 351 may transmit on-air information regarding whether the live stream data is currently on air and a current shift time that is an index specifying previous data currently being played through a time machine function based on latest data of the live stream data, as a response to the time machine control request to the player 352 through the time machine control session, and the player may determine a program stop time based on a combination of the on-air information and the current shift time.

The description omitted in FIGS. 12 and 13 may refer to the description made above with reference to FIGS. 1 through 11.

According to example embodiments, a time machine control protocol may be in charge of only controlling a time machine function and a streaming protocol between a streaming client 351 and a player 352 may be configured to use a streaming standard supported at the player as is. Also, according to example embodiments, it is possible to remove a dependence of a streaming client 351 on a player 352 by controlling a time machine function using the same standard regardless of the OS or the player.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable recording medium storing a computer program to implement a time machine function providing method in combination with a computer that configures an electronic device, the time machine function providing method comprising:
   setting, at a streaming client installed on the electronic device, a streaming session with a player installed on the electronic device to provide a live streaming service;
   sequentially transmitting, by the streaming client, live stream data received over a network to the player through the streaming session;
   setting, at the streaming client, a time machine control session with the player, wherein the time machine control session between the streaming client and the player is separate from the streaming session between the streaming client and the player;
   receiving, at the streaming client, a time machine control request from the player through the time machine control session; and
   transmitting, by the streaming client, live stream data of a channel corresponding to the time machine control request that includes play location information among time machine control requests sequentially from a play location specified based on the play location information through the streaming session.

2. The non-transitory computer-readable recording medium of claim 1, wherein a data transmission between the streaming client and the player through the streaming session occurs according to a first protocol and a data transmission between the streaming client and the player through the time machine control session occurs according to a second protocol, wherein the first protocol and the second protocol are independent from each other.

3. The non-transitory computer-readable recording medium of claim 1, wherein the time machine function providing method further comprises:
   receiving, at the streaming client, an authorization request from the player through the time machine control session, the authorization request including information used to specify the live stream data of the channel corresponding to the time machine control request or a channel and an authorization key; and
   authorizing, at the streaming client, the player using the authorization key, and in response to a success in authorizing the player, including an eigenvalue assigned to the time machine control session in a response to the authorization request as a session key, and transmitting the response to the player.

4. The non-transitory computer-readable recording medium of claim 3, wherein the time machine function providing method further comprises:
  verifying, at the streaming client, whether the time machine control request includes the session key, and authorizing the time machine control request.

5. The non-transitory computer-readable recording medium of claim 3, wherein the time machine function providing method further comprises:
  in response to authorizing another player in response to an authorization request from the other player installed on the electronic device, transmitting, at the streaming client, a session key that includes an eigenvalue assigned to a time machine control session set with the other player to the other player, and invalidating a session key with an existing player.

6. The non-transitory computer-readable recording medium of claim 1, wherein the time machine function providing method further comprises:
  receiving, at the streaming client, an information acquirement and session maintain request from the player through the time machine control session; and
  including, at the streaming client, time machine time information about live stream data that is being provided to the player through the streaming session, in a response to the information acquirement and session maintain request, and transmitting the response to the player through the time machine control session.

7. The non-transitory computer-readable recording medium of claim 6, wherein the time machine time information includes a maximum available shift time preset for each set of live stream data as an index indicating a level capable of seeking previous data based on latest data of the live stream data, a current available shift time that is an index indicating a level capable of seeking previous data at a current point in time based on the latest data, and a current shift time that is an index specifying previous data currently being played through a time machine function based on the latest data.

8. The non-transitory computer-readable recording medium of claim 1, wherein the time machine function providing method further comprises:
  receiving, at the streaming client, channel identification information and a play request that includes a program key for identifying live stream data of a specific program in live stream data of a channel identified based on the channel identification information, through the time machine control session; and
  sequentially transmitting, by the streaming client to the player, live stream data identified through the program key in the live stream data of the channel identified based on the channel identification information.

9. The non-transitory computer-readable recording medium of claim 8, wherein the live stream data received over the network is transmitted from a delivery server to the electronic device over the network, and
  the delivery server is configured to match live stream data for each channel and each program based on the channel identification information and the program key, and thereby store in a time machine buffer included in the delivery server.

10. The non-transitory computer-readable recording medium of claim 8, wherein the play request further includes information about at least one of availability of a time machine function, an initial play start location of the identified live stream data, and whether to start a channel in a pause state.

11. The non-transitory computer-readable recording medium of claim 1, wherein the time machine function providing method further comprises:
  storing, at the streaming client, a currently playing location in the live stream data of a channel corresponding to the time machine control request in response to receiving a pause request through the time machine control session, and suspending a transmission of the live stream data; and
  sequentially transmitting, at the streaming client, the live stream data of the channel corresponding to the time machine control request to the player from the stored location, in response to receiving a resume request through the time machine control session.

12. The non-transitory computer-readable recording medium of claim 11, wherein a connection of the channel is terminated in response to the pause request and is resumed in response to the resume request.

13. The non-transitory computer-readable recording medium of claim 1, wherein the time machine function providing method further comprises:
  transmitting, by the streaming client, on-air information regarding whether the live stream data of the channel corresponding to the time machine control request is currently on air and a current shift time that is an index specifying previous data currently being played through a time machine function based on latest data of the live stream data of the channel corresponding to the time machine control request, as a response to the time machine control request to the player through the time machine control session, and,
  the player determines a program stop time based on a combination of the on-air information and the current shift time.

14. A time machine function providing method of an electronic device configured as a computer, the method comprising:
  setting, at a streaming client installed on the electronic device, a streaming session with a player installed on the electronic device to provide a live streaming service;
  sequentially transmitting, by the streaming client, live stream data received over a network to the player through the streaming session;
  setting, at the streaming client, a time machine control session with the player, wherein the time machine control session between the streaming client and the player is separate from the streaming session between the streaming client and the player;
  receiving, at the streaming client, a time machine control request from the player through the time machine control session; and
  transmitting, by the streaming client, live stream data of a channel corresponding to the time machine control request that includes play location information among time machine control requests sequentially from a play location specified based on the play location information through the streaming session.

15. The method of claim 14, wherein a data transmission between the streaming client and the player through the streaming session occurs according to a first protocol and a data transmission between the streaming client and the player through the time machine control session occurs according to a second protocol, wherein the first protocol and the second protocol are independent from each other.

16. The method of claim 14, further comprising:

receiving, at the streaming client, an authorization request from the player through the time machine control session, the authorization request including information used to specify live stream data of the channel corresponding to the time machine control request or a channel and an authorization key; and authorizing, at the streaming client, the player using the authorization key, and in response to a success in authorizing the player, including an eigenvalue assigned to the time machine control session in a response to the authorization request as a session key, and transmitting the response to the player.

17. The method of claim 14, further comprising:

receiving, at the streaming client, an information acquirement and session maintain request from the player through the time machine control session; and including, at the streaming client, time machine time information about live stream data that is being provided to the player through the streaming session, in a response to the information acquirement and session maintain request, and transmitting the response to the player through the time machine control session.

18. The method of claim 14, further comprising:

receiving, at the streaming client, channel identification information and a play request that includes a program key for identifying live stream data of a specific program in live stream data of a channel identified based on the channel identification information, through the time machine control session; and sequentially transmitting, by the streaming client to the player, live stream data identified through the program key in the live stream data of the channel identified based on the channel identification information.

19. The method of claim 14, further comprising:

storing, at the streaming client, a currently playing location in the live stream data of the channel corresponding to the time machine control request in response to receiving a pause request through the time machine control session, and suspending a transmission of the live stream data; and sequentially transmitting, by the streaming client, the live stream data of the channel corresponding to the time machine control request to the player from the stored location, in response to receiving a resume request through the time machine control session.

20. The method of claim 14, further comprising:

transmitting, by the streaming client, on-air information regarding whether the live stream data of the channel corresponding to the time machine control request is currently on air and a current shift time that is an index specifying previous data currently being played through a time machine function based on latest data of the live stream data of the channel corresponding to the time machine control request, as a response to the time machine control request to the player through the time machine control session, wherein the player determines a program stop time based on a combination of the on-air information and the current shift time.

* * * * *